United States Patent [19]
Endo et al.

[11] Patent Number: 5,574,352
[45] Date of Patent: Nov. 12, 1996

[54] FREQUENCY CONTROL METHOD FOR INVERTER AND APPARATUS THEREFOR

[75] Inventors: Tsunehiro Endo; Tsuyoshi Sasaki, both of Narashino; Hiroshi Fujii, Chiba; Seiji Ishida, Hitachi, all of Japan

[73] Assignee: Hitachi, Ltd., Tokyo, Japan

[21] Appl. No.: 277,977

[22] Filed: Jul. 20, 1994

[30] Foreign Application Priority Data

Jul. 20, 1993 [JP] Japan .................................. 5-178832

[51] Int. Cl.⁶ ....................................................... H02P 5/34
[52] U.S. Cl. ............................ 318/802; 318/811; 395/61
[58] Field of Search .................................. 318/798–811; 395/3, 61

[56] References Cited

U.S. PATENT DOCUMENTS

| | | | |
|---|---|---|---|
| 5,272,428 | 12/1993 | Spiegel et al. | 318/803 |
| 5,291,390 | 3/1994 | Satou | 364/148 |
| 5,355,065 | 10/1994 | Narazaki et al. | 318/632 |
| 5,359,154 | 10/1994 | Tsukasa et al. | 318/801 X |

*Primary Examiner*—David S. Martin
*Attorney, Agent, or Firm*—Antonelli, Terry, Stout & Kraus

[57] ABSTRACT

A trip-resistant frequency control inverter which prevents an overcurrent and overvoltage by frequency control of a motor. Such arrangement provides for generating an accelerating or decelerating rate from the output from a fuzzy controller, which inputs the difference between limiting values and detected values and their changes. The arrangement also provides at the time of acceleration a control which automatically generates an accelerating rate which maintains the current in the vicinity of the limiting value, and a normal acceleration part which adjusts the set accelerating rate. The arrangement further provides at the time of deceleration a control which automatically generates a decelerating rate which maintains the current and voltage in the vicinity of their limiting values, and a normal deceleration part which adjusts the set decelerating rate. Further, the arrangement provides during a steady state operation a control which automatically determines the accelerating or decelerating rate which maintains the current in the vicinity of the limiting value, and wherein the two control parts for automatic and normal operation are selectable by an operator.

14 Claims, 26 Drawing Sheets

FIG. 9

| ASSIGNED CONTROLLERS | EXECUTION START CONDITIONS | EXECUTION COMPLETE CONDITIONS |
|---|---|---|
| FUZZY AUTOMATIC ACCEL. UNIT | ALWAYS AT WORK WHEN THIS ACCEL. UNIT IS OPERATING | |
| FUZZY AUTOMATIC DECEL. UNIT | ALWAYS AT WORK WHEN THIS DECEL. UNIT IS OPERATING | |
| FUZZY AUTOMATIC OVERLOAD CONTROLLER | ALWAYS AT WORK WHEN THIS OVERLOAD CONTROL IS OPERATING | |
| NORMAL ACCEL. WITH FUZZY PROTECTION | PREDICTED DISTANCE AFTER SAMPLING k OR PRESENT DISTANCE ≧ 0 (MEASUREMENT ≧ LIMIT VALUE) | UPON COMPLETION OF ACCEL (WHEN SHIFTING TO DECEL. OR CONSTANT MODE) |
| NORMAL DECEL. WITH FUZZY PROTECTION | PREDICTED DISTANCE AFTER SAMPLING k ON VOLTAGE/CURRENT OR PRESENT DISTANCE ≧ 0 (MEASUREMENT ≧ LIMIT VALUE) | UPON COMPLETION OF DECEL. (WHEN SHIFTING TO ACCEL. OR CONSTANT MODE) |

FIG. 12

| RATE / DISTANCE | PL ↗ | PS ↗ | ZE → | NS ↘ | NL ↘ |
|---|---|---|---|---|---|
| PL ⊢•⎯ | ⬇ No.20PL | ⬇ No.21PL | ⬇ No.22PS | — No.23ZE | ⬆ No.24NS |
| PS ⊢•⎯ | ⬇ No.15PL | ⬇ No.16PL | ⬇ No.17PS | — No.18ZE | ⬆ No.19NS |
| ZE ⎯•⎯ | ⬇ No.10PS | ⬇ No.11PS | ⬆ No.12NS | ⬆ No.13NS | ⬆ No.14NS |
| NS ⎯•⊣ | ⬇ No.5PL | ⬇ No.6PS | ⬆ No.7NS | ⬆ No.8NS | ⬆ No.9NL |
| NL ⎯•⊣ | ⬇ No.0PS | ⬇ No.1PS | ⬆ No.2NS | ⬆ No.3NL | ⬆ No.4NL |

FIG. 15

| DISTANCE \ RATE | PL ↗ | PS ↗ | ZE → | NS ↘ | NL ↘ |
|---|---|---|---|---|---|
| PL | ⬇⬇ No. 25 NL | ⬇⬇ No. 26 NL | ⬇ No. 27 NS | — No. 28 ZE | — No. 29 ZE |
| PS | ⬇⬇ No. 20 NL | ⬇⬇ No. 21 NL | ⬇ No. 22 NS | — No. 23 ZE | — No. 24 ZE |
| ZE | ⬇⬇ No. 15 NS | ⬇ No. 16 NS | ⬆ No. 17 PS | ⬆ No. 18 PS | ⬆⬆ No. 19 PL |
| NS | ⬇⬇ No. 10 NL | ⬇ No. 11 NS | ⬆ No. 12 PS | ⬆ No. 13 PS | ⬆⬆ No. 14 PL |
| NL | ⬇ No. 5 NS | — No. 6 ZE | ⬆ No. 7 PS | ⬆⬆ No. 8 PL | ⬆⬆ No. 9 PL |
| NLL | ⬇ No. 0 NS | — No. 1 ZE | ⬆ No. 2 PS | ⬆⬆ No. 3 PL | ⬆⬆ No. 4 PL |

FIG. 18

| RATE / DISTANCE | PL ↗ | PS ↗ | ZE → | NS ↘ | NL ↘ |
|---|---|---|---|---|---|
| PL ⊢•⎯ | ⬇ No. 20 PL | ⬇ No. 21 PS | ⬇ No. 22 PS | — No. 23 ZE | ⬆ No. 24 NS |
| PS ⊢•⎯ | ⬇ No. 15 PL | ⬇ No. 16 PS | ⬇ No. 17 PS | — No. 18 ZE | ⬆ No. 19 NS |
| ZE ⎯•⎯ | ⬇ No. 10 PS | — No. 11 ZE | — No. 12 ZE | — No. 13 ZE | ⬆ No. 14 NS |
| NS ⎯•⊣ | ⬇ No. 5 PL | ⬇ No. 6 PS | — No. 7 ZE | — No. 8 ZE | ⬆ No. 9 NS |
| NL ⎯•⊣ | ⬇ No. 0 PS | ⬇ No. 1 PS | — No. 2 ZE | — No. 3 ZE | ⬆ No. 4 NS |

FIG. 19

| RATE / DISTANCE | PL ↗ | PS ↗ | ZE → | NS ↘ | NL ↘ |
|---|---|---|---|---|---|
| PL | ⬇ No. 20 PL | ⬇ No. 21 PL | ⬇ No. 22 PL | ↓ No. 23 PS | — No. 24 ZE |
| PS | ⬇ No. 15 PL | ⬇ No. 16 PL | ⬇ No. 17 PL | ↓ No. 18 PS | — No. 19 ZE |
| ZE | ⬇ No. 10 PL | ↓ No. 11 PS | — No. 12 ZE | — No. 13 ZE | ⬆ No. 14 NS |
| NS | ⬇ No. 5 PL | ↓ No. 6 PS | — No. 7 ZE | ⬆ No. 8 NS | ⬆ No. 9 NS |
| NL | ⬇ No. 0 PS | ⬇ No. 1 PS | — No. 2 ZE | — No. 3 ZE | — No. 4 ZE |

FIG. 22

| RATE / DISTANCE | PL ↗ | PS ↗ | ZE → | NS ↘ | NL ↘ |
|---|---|---|---|---|---|
| PL | ⬇ No. 20 PL | ⬇ No. 21 PL | ⬇ No. 22 PL | ⬇ No. 23 PS | — No. 24 ZE |
| PS | ⬇ No. 15 PL | ⬇ No. 16 PL | ⬇ No. 17 PS | — No. 18 ZE | — No. 19 ZE |
| ZE | ⬇ No. 10 PS | ⬇ No. 11 PS | ⬆ No. 12 NS | ⬆ No. 13 NS | ⬆ No. 14 NL |
| NS | ⬇ No. 5 PS | — No. 6 ZE | ⬆ No. 7 NS | ⬆ No. 8 NL | ⬆ No. 9 NL |
| NL | ⬇ No. 0 PS | — No. 1 ZE | ⬆ No. 2 NS | ⬆ No. 3 NL | ⬆ No. 4 NL |

FIG. 23

| DISTANCE \ RATE | PL ↗ | PS ↗ | ZE → | NS ↘ | NL ↘ |
|---|---|---|---|---|---|
| PL | ⬇ No. 25 NL | ⬇ No. 26 NL | ⬇ No. 27 NL | ⬇ No. 28 NL | ⬇ No. 29 NL |
| PS | ⬇ No. 20 NL | ⬇ No. 21 NL | ⬇ No. 22 NL | ⬇ No. 23 NS | ⬇ No. 24 NS |
| ZE | ⬇ No. 15 NL | ⬇ No. 16 NS | ⬇ No. 17 NS | ⬆ No. 18 PS | ⬆ No. 19 PS |
| NS | ⬇ No. 10 NL | ⬇ No. 11 NS | — No. 12 ZE | ⬆ No. 13 PS | ⬆ No. 14 PL |
| NL | ⬇ No. 5 NS | ⬇ No. 6 NS | ⬆ No. 7 PS | ⬆ No. 8 PL | ⬆ No. 9 PL |
| NLL | ⬇ No. 0 NS | ⬆ No. 1 PS | ⬆ No. 2 PL | ⬆ No. 3 PL | ⬆ No. 4 PL |

FIG. 26

| DIS-TANCE \ RATE | PL ↗ | PS ↗ | ZE → | NS ↘ | NL ↘ |
|---|---|---|---|---|---|
| PL | ⬇ | ⬇ | ⬇ | ⬇ | ⬇ |
|  | No. 20 NL | No. 21 NL | No. 22 NL | No. 23 NL | No. 24 NS |
| PS | ⬇ | ⬇ | ⬇ | — | — |
|  | No. 15 NL | No. 16 NL | No. 17 NS | No. 18 ZE | No. 19 ZE |
| ZE | ⬇ | ⬇ | ⬆ | ⬆ | ⬆ |
|  | No. 10 NL | No. 11 NS | No. 12 PS | No. 13 PS | No. 14 PS |
| NS | ⬇ | — | ⬆ | ⬆ | ⬆ |
|  | No. 5 NL | No. 6 ZE | No. 7 PS | No. 8 PS | No. 9 PS |
| NL | — | — | ⬆ | ⬆ | ⬆ |
|  | No. 0 ZE | No. 1 ZE | No. 2 PL | No. 3 PL | No. 4 PL |

FREQUENCY CONTROL METHOD FOR INVERTER AND APPARATUS THEREFOR

BACKGROUND OF THE INVENTION

The present invention relates to an inverter for controlling and driving an electric motor to be driven at variable speeds, and in particular it relates to a control method and apparatus for controlling the inverter by suppressing an overcurrent and overvoltage arising during acceleration or deceleration of the electric motor.

In the variable speed operation of electric motors by means of an inverter which inverts a direct current into an alternating current with a variable voltage and variable frequency, when a time set for adjusting the speed is too short with respect to the magnitude or inertia of a load under an accelerating or decelerating operation, it is likely that an overcurrent will flow through the inverter. In particular, under a decelerating operation, that inertial energy on the load side is regenerated into the dc voltage side to increase the voltage thereof, sometimes resulting in an excessively large voltage. In order to avoid such problems it has been practiced for all drive apparatuses which employ a conventional inverter to adjust its acceleration and deceleration periods before starting actual operation.

On the other hand, under a steady state operation at a constant frequency, there occurs an overcurrent when the magnitude of the load increases sufficiently to cause an overload irrespective of whether the load increase occurs gradually or rapidly.

As a means for protecting the inverter from an overcurrent and overvoltage occurring due to erroneous setting of the acceleration or deceleration times or due to a load change, there is known a method which stops the inverter when its current or voltage exceeds a first limiting value. In addition to this method, the following method has been practiced, which allows a continuous operation of the inverter without stopping it.

Namely, according to this latter method, in an accelerating operation, while the current is above a second current limiting value which is lower than the aforementioned first limiting value, the increasing of the frequency is stopped. Also, in a decelerating operation, while the current is above a given second current limiting value, or while the voltage is above a second voltage limiting value which is below the aforementioned first voltage limiting value, the decreasing of the frequency is stopped. Further, for protection of any overload in a steady operation mode, while the current is above the second current limiting value which is lower than the first limiting value, the frequency is caused to decrease at a decelerating rate, which has been adjusted and preset before starting the actual operation. As an example of control apparatuses of this kind which have implemented a protective system capable of maintaining a continuous operation, as described above, general-purpose inverters are already on the market.

On the other hand, as another protective system, there is one described in the Japanese Patent Application Laid-open No. 3-265480. This is directed to preventing a motor breakdown due to a rapid acceleration or deceleration thereof, which is implemented by correcting a reference acceleration such that the motor current maintains a predetermined allowable motor current value whenever the motor is judged to be accelerating or decelerating. As its correction method, it has been suggested to utilize a difference or ratio between a value of the motor current and the allowable value thereof.

As still another protective system, there is one described in Japanese Patent Application Laid-open No. 57-135699, which discloses an inverter controller for driving ac motors, in which, for a loading current which is above the predetermined, that its acceleration rate is lowered when the motor is in a power-running state, and its decelerating rate is lowered when the motor is in regenerating-running state.

Moreover, according to the Japanese Patent Applications Laid-open Nos. 61-207179 and 61-207180 there have been disclosed control methods for a pulse width modulation tape inverter, which methods control the dc voltage to be input to the inverters by means of an ac-dc converter, and in which it is disclosed that in order to control the deceleration period of time, a comparison is made between the dc voltage and the reference voltage value, or an overcurrent is detected.

SUMMARY OF THE INVENTION

However, according to the foregoing related conventional inverter systems, there are problems in that a lot of time is required for adjusting and setting of an optimum acceleration or deceleration period of time (or accelerating and decelerating rates) at the time of accelerating or decelerating operation, as well as in the adjusting and setting of a decelerating rate under overload protective running during steady state operation, with the result that they are troublesome and time-consuming. Further, since their control methods for protecting from overcurrents or overvoltage while maintaining a continuous operation are enabled to start only after respective currents or voltages have exceeded the second current limiting value or the second voltage limiting value, they have exhibited problems in that the currents or voltages which have reached the first limiting value due to a rapid change in the current or voltage are likely to stop the inverter operation.

A first object of the present invention is to provide a method and an apparatus which are capable of eliminating the time-consuming troublesome operations required in adjusting and setting of the acceleration and deceleration periods of time associated with the conventional inverter, preventing the current and voltage from exceeding the first limiting values so as to stop the inverter operation, and automatically generating an accelerating or decelerating rate which permits an accelerating and decelerating operation of the motor.

A second object of the invention is to provide a method and an apparatus which are capable of automatically correcting an accelerating or decelerating rate set corresponding to a particular period of time so that the inverter will not stop its operation even if there occurs a rapid change in the current or voltage due to an erroneous setting of the acceleration or deceleration periods of time.

A third object of the invention is to provide a method and an apparatus for protecting the inverter from an overload which, even in the presence of a rapid increase of the load, is capable of automatically determining a decelerating rate suitable for implementing a deceleration protection without the need for a troublesome setting of decelerating rates, and without stopping the inverter.

Still further, a fourth object of the invention is to provide an apparatus which can arbitrarily select either one of available operations according to the automatic generation of the accelerating or decelerating rates in accordance with the first object of the invention described above and according to the setting of the accelerating or decelerating periods of time in accordance with the above second object of the invention, or an apparatus which can arbitrarily select either one of the overload protection by means of the automatic generation of the decelerating rate in accordance with the above third object of the invention and by the prior art setting of the decelerating rate.

[Measures to Solve the Problems]

(1) In order to accomplish the aforementioned plurality of objects, it is contemplated in accordance with the present invention, in principle, to provide a fuzzy control unit to which are input two quantities, such as a difference between a current or voltage value detected and its corresponding limiting value, and a quantity of change of the difference, and from which is output a quantity of correction for a generated quantity of an accelerating or decelerating rate or a set accelerating or decelerating rate to adapt to, so as to accomplish an optimum frequency control of the inverter.

(2) The first object of the invention is accomplished by providing an arrangement in which, under an accelerating operation, in dependence on an output from the fuzzy control unit, which receives as its input data a difference between a current limiting value and a detected current value, and a quantity of its change, an accelerating rate is adjusted such that its current is maintained in the vicinity of the current limiting value; and, under a decelerating operation, in dependence on combined outputs from the first fuzzy control unit, which receives as its input data the difference between the current limiting value and the detected current value and the quantity of its change, and from a second fuzzy control unit, which receives as its input data a difference between a voltage limiting value and a detected voltage value, and a quantity of change of its difference, a decelerating rate is adjusted such that its voltage is maintained below the voltage limiting value and its current is maintained in the vicinity of the current limiting value as well.

(3) The second object of the invention is achieved by providing such arrangements that, when the current is likely to rise to the vicinity of the current limiting value, while being accelerated at a set accelerating rate, a correction is given to the set acceleration/decelerating rate in dependence on an output from the fuzzy controller unit, which receives as its inputs a difference between the current limiting value and a detected current value, and a quantity of its changes, so that the current may be maintained in the vicinity of and below the current limiting value; and, on the other hand, when the voltage is likely to exceed the voltage limiting value while being decelerated at a set decelerating rate, a correction is given to the set decelerating rate in dependence on an output from the fuzzy controller unit, which receives as its inputs a difference between the voltage limiting value and a detected voltage value, and a quantity of its changes, so that the voltage may be maintained in the vicinity of and below the voltage limiting value; and, in addition to the above, when the current is likely to rise to the vicinity of the current limiting value, further correction is added to the set decelerating rate to produce update data in dependence on an output from the fuzzy controller unit which received as its inputs a difference between the current limiting value and the detected current value, and the quantity of its changes.

(4) The third object of the invention can be achieved in such a manner that, when the current is likely to increase to exceed the current limiting value in the steady-state running state, an optimum update accelerating/decelerating rate is generated in response to the output from the fuzzy controller, which receives as its inputs a difference between the current limiting value and the detected current, and the quantities of its changes, so that the current is maintained in the vicinity of the current limiting value, will the result that either deceleration or acceleration in accordance therewith may be executed.

(5) Further, the fourth object of the invention may be achieved by providing an arrangement in which there is an acceleration/deceleration means adapted for achieving the foregoing first object of the invention, another acceleration/deceleration means adapted for achieving the second object of the invention, a setting means for setting an acceleration/deceleration mode, and an acceleration/deceleration select means for selecting from the foregoing two acceleration/deceleration means in response to a set mode reference input to the acceleration/deceleration mode setting means by the operator. Likewise, this may be achieved also by providing an overload protection means adapted for achieving the foregoing third object of the invention, a prior art overload protection means which sets a decelerating rate, an overload protection mode setting means and an overload protection select means for selecting one of the foregoing two overload protection means in response to a set mode that the operator inputs to the overload protection mode setting means.

[Operation]

The fuzzy controller unit according to the invention is adapted to determine an incremental quantity or decremental quantity for the frequency in accordance with a specific distance between a current or voltage and its limiting value, and its approaching rate, such that the current or voltage may be maintained in the vicinity of or less than its corresponding limiting value. Consequently, since the frequency can be determined on the basis of information including differential quantities of currents or voltages, it becomes possible to carry out a predictive frequency control, thereby enabling the current or voltage to be maintained in the vicinity of or below the second limiting value before they reach the first limiting value over which the inverter must be stopped.

BRIEF DESCRIPTION OF THE DRAWINGS

The present invention will be more clearly understood from the following descriptions of the preferred embodiments of the invention when taken in conjunction with the accompanying drawings, in which:

FIG. 9 explains the execution conditions for executing various fuzzy controllers according to the invention;

FIG. 12 is a diagram of a rule table to be used in the fuzzy-protected normal acceleration unit of one embodiment of the invention;

FIG. 15 is a diagram of a rule table to be used in the fuzzy automatic acceleration unit of one embodiment of the invention;

FIG. 18 is a diagram which illustrates the current side rule table to be used in the normal deceleration unit with the fuzzy protection according to the invention;

FIG. 19 is a diagram which illustrates the voltage side rule table to be used in the normal deceleration unit with the fuzzy protection according to the invention;

FIG. 22 is a diagram of the voltage side rule table to be used in the fuzzy automatic deceleration unit of the invention;

FIG. 23 is a diagram of the current side rule table to be used in the fuzzy automatic deceleration unit of the invention;

FIG. 26 is a diagram which illustrates the rule table to be used in the fuzzy automatic overload controller of one embodiment of the invention.

PREFERRED EMBODIMENTS

With reference to the accompanying drawings, preferred embodiments of the invention will be described in detail.
{Hardware Architecture}

Figure 2:
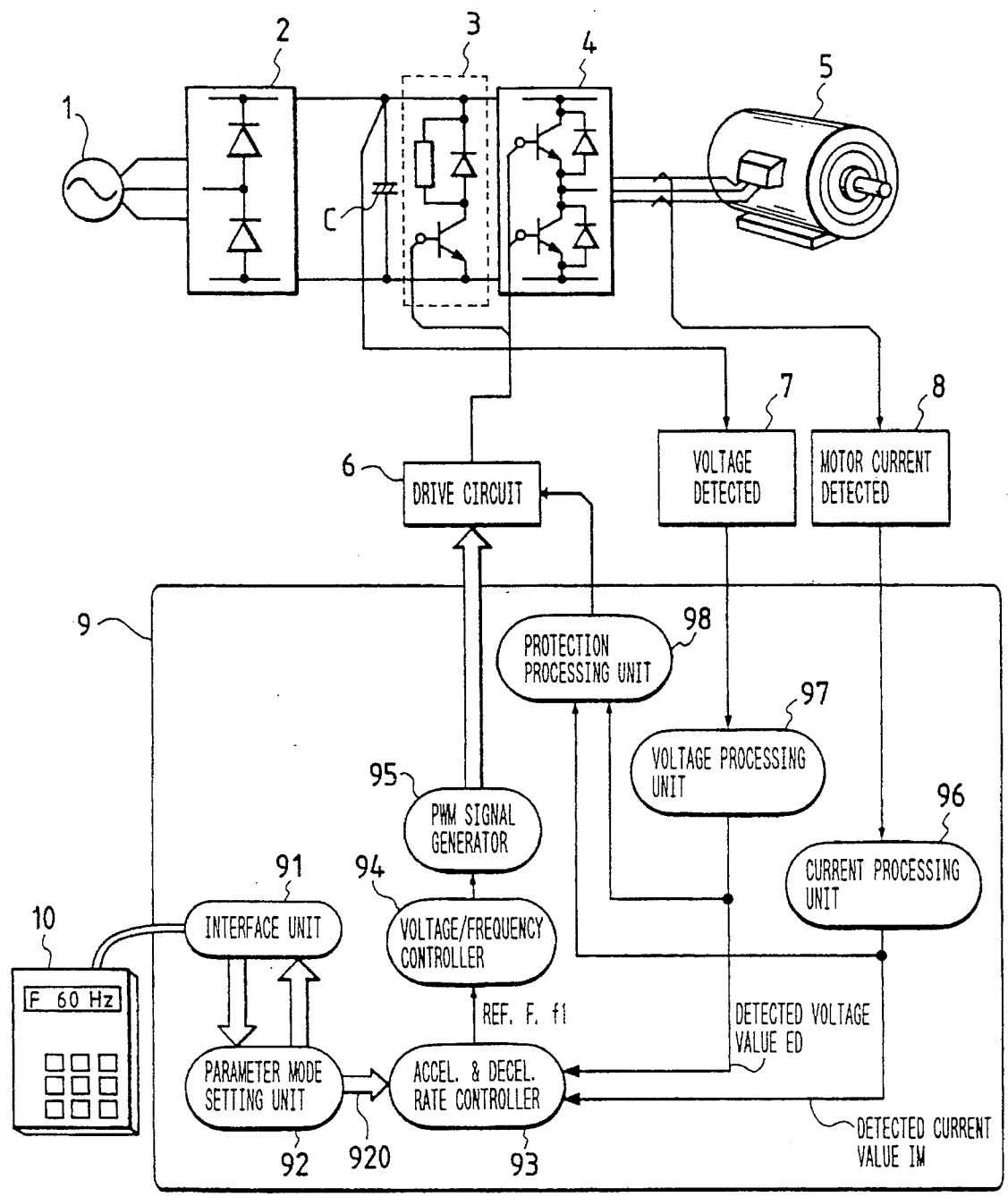
FIG. 2 is a schematic diagram of the hardware construction of the inverter apparatus of one embodiment of the invention.

(1) FIG. 2 is a schematic block diagram illustrative of an inverter apparatus forming one embodiment of the invention. A three-phase ac source 1 supplies power to a converter 2 which, in conjunction with a smoothing capacitor C, produces a dc voltage, which is supplied to a three-phase PWM control type inverter 4 in which a variable-voltage, variable-frequency 3-phase ac voltage is produced to drive an induction motor 5. Further, in order to prevent an excessive voltage from being regenerated on the dc voltage side due to regeneration energy at the time of deceleration, a brake circuit 3 is provided to consume such regeneration energy.

(2) A controller unit 9 is a basic component of the inverter apparatus of the invention, which is comprised mainly of microcomputers and software, such as DSP. In the periphery of the controller unit 9 and coupled thereto, there are a voltage detection unit 7, a motor current detection unit 8, a drive circuit 6 and an operator 10.

The voltage detection unit 7 detects a dc voltage to be input to the inverter 4 and transmits it to a voltage processing unit 97 in the controller 9. The voltage processing unit 97 then produces a voltage detection value ED which is proportional to the detected dc voltage.

Further, information indicative of a motor current flowing through the windings of the induction motor 5 is transmitted via a motor current detection unit 8 to a current processing unit 96 in the controller 9. The current processing unit 96 then produces a current detection value IM which is proportional to the detected Ia motor current.

The operator 10 is an I/O unit for this inverter apparatus through which setting of various parameters and operation modes is input, and related information in the inverter apparatus is displayed thereon. Operational data input via the operator 10 is transmitted through an interface unit 91 in the controller 9 to a parameter mode setting unit 92.

On the other hand, the drive circuit 6 is adapted to drive switching elements constituting the inverter 4 in response to a signal from a PWM signal generator unit 95 within the controller 9.

(3) An acceleration/deceleration control unit 93 within the controller 9 is a key component of the invention, to which are entered the aforementioned detected voltage value ED, detected current value IM as well as various set data and mode data from the parameter/mode setting unit 92, and which outputs a reference frequency fq. Responsive to this reference frequency f1, a voltage/frequency control unit 94 produces appropriate time data necessary for a desirable PWM control, whereby the actual output voltage from the inverter 4 may become a preferred voltage value and frequency, and in accordance with the thus produced time data, an appropriate PWM signal is generated in the foregoing PWM signal generating unit 95.

Further, a protection processing unit 98 executes processing to stop the inverter 4 when the detected current value IM or the detected voltage value ED exceeds its first limiting value, or to cause the brake 3 to operate when the detected voltage value exceeds the third limiting value.

{2. The Acceleration/Deceleration Control Unit}
[2.1 Construction of the Acceleration/Deceleration Control Unit]

Figure 1:
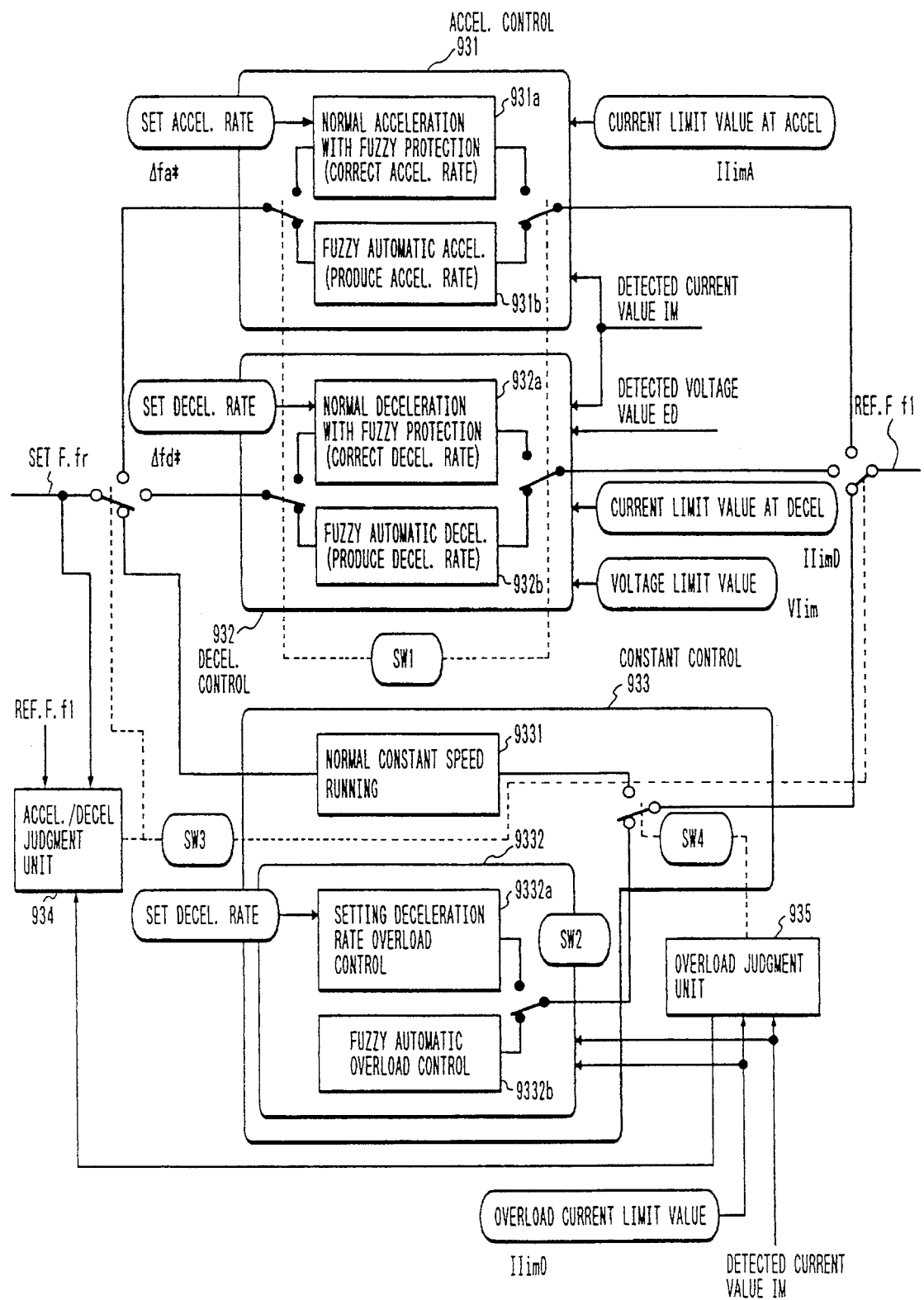
FIG. 1 is a schematic diagram of the acceleration controller forming one embodiment of the invention.

(1) With reference to FIG. 1, a schematic control arrangement of the acceleration/deceleration control unit 93, which is the basic component for implementing the invention, will be described in the following. In FIG. 1, the contents of a task to be realized by software are expressed in images of hardware.

This acceleration/deceleration control unit 93 comprises three control subunits, in principle, including an acceleration control unit 931, a deceleration control unit 932, and a steady-state control unit 933. Switching between these three control units is executed by a switch SW3 in conjunction with an acceleration/deceleration judgment unit 934, which determines the position of the switch according to a greater or smaller relationship between a set frequency fr from the parameter/mode setting unit 92 and a reference frequency f1 output from the acceleration/deceleration control unit 93, and also from a result of judgment as to whether or not an overload exists by an overload judgment unit 935 to be described later.

(2) The acceleration control unit 931 is provided with a normal acceleration part having a fuzzy protection feature 931a and a fuzzy automatic acceleration part 931b. Also, the deceleration control unit 932 is provided with a normal deceleration part having a fuzzy protection feature 932a and a fuzzy automatic deceleration unit 932b. Further, the steady-state normal constant speed control unit 933 is provided with operation part 9331 and an overload operation part 9332, and these two modes of operation 9331 and 9332 are switched therebetween by a switch SW4. That which determines the operation of the switch SW4 is the overload judgment unit 935 to which the current limiting value and the detected current value IM are input. The foregoing overload operation part 9332 is further provided with a deceleration setting overload control part 9332a and a fuzzy automatic overload control part 9332b.

(3) Three kinds of combinations including either two of the foregoing are contemplated, that is, a combination of 931a and 931b, a combination of 932a and 932b, and a combination of 9332a and 9332b, of which the former two combinations are arranged to be switched by a switch SW1 and the latter one by a switch SW2. Then, the operation of these two switches SW1 and SW2 is determined in accordance with a particular mode input by the operator via the operator console 10 and through the interface unit 91 and the parameter/mode setting unit 92. Namely, in each of the above three combinations, one of the two therein is selected by the operator.

(4) With reference to FIG. 1, each input data to be input to each control unit, indicated such as by a set accelerating rate $\Delta fa^*$, a set decelerating rate $\Delta fd$, and an overload set decelerating rate $\Delta fd_o^*$, is data obtained from the operator console 10 set by the operator similar to the aforementioned set frequency fr. Further, an accelerating current limiting value $I_{lim}A$ at the time of acceleration, a decelerating current limiting value $I_{lim}D$ at the time of deceleration, and a voltage limiting value $V_{lim}$ are assumed to be set in the same manner. On the other hand, the detected current value IM and detected voltage value ED are input data from the current processing unit 96 and the voltage processing unit 97, respectively, as described above.

{2.2 Outline of Operation of Acceleration Control Unit 931}

(1) The acceleration control unit 931 is selected by SW3 for execution when the set frequency fr is greater than the reference frequency f1 (but is not necessarily applicable when executing overload control). Then, an appropriate accelerating rate is determined such that the detected current value IM will not rise to the vicinity of or above the current limiting value $I_{lim}A$, and thereby the acceleration is performed at the accelerating rate thus determined.

By way of example, when the detected current value IM is likely to exceed the current limiting value $I_{lim}A$ while being accelerated at the set accelerating rate $\Delta fa^*$, the normal acceleration unit having fuzzy protection features 931a on one hand is adapted to correct the set accelerating rate $\Delta fa^*$ such that the detected current value may be maintained in the vicinity of or below the current limiting value. On the other hand, the fuzzy automatic acceleration unit 931b automatically produces an appropriate accelerating rate which ensures that the detected current value IM is maintained in the vicinity of the current limiting value $I_{lim}A$.

{2.3 Outline of Operation of Deceleration Control Unit 932}

(1) The deceleration control unit 932 is selected by SW3 for execution when the set frequency fr is smaller than the reference frequency f1. Then, an appropriate decelerating rate is determined, such that the detected current value IM will not rise to the vicinity or above the current limiting value, and the detected voltage value ED will not exceed the vicinity of the voltage limiting value $V_{lim}$.

(2) Here, while decelerating at the set decelerating rate $\Delta fd^*$, when the detected current value IM is likely to exceed the current limiting value $I_{lim}D$, or when the detected voltage value ED is likely to exceed the voltage limiting value $V_{lim}$, the fuzzy-protection provided normal deceleration unit 932a on one hand is adapted to correct the set decelerating rate $\Delta fd$, such that the detected values of the current and voltage may be maintained in the vicinity of or below their limiting values. The fuzzy automatic acceleration/deceleration unit, on the other hand, automatically generate a decelerating rate such that the detected current value IM may be maintained in the vicinity of the current limiting value $I_{lim}D$ when the detected voltage value ED is substantially below the voltage limiting value $V_{lim}$, and further, such that the detected voltage value ED will not exceed the voltage limiting value or be maintained in the vicinity thereof.

{2.4 Outline of the Operations of Overvoltage Operation of Unit 9332}

(1) The steady-state control unit 933 is selected via the switch SW3 when it is judged that the set frequency fr equals the reference frequency f1, or when, even though they are not the same, the overload condition is judged to be present by the overload judgment unit 935. Further, inside the steady-state control unit 933, in the presence of the overload condition, the overload running control part 9332 is selected via the switch SW4 for execution.

(2) The decelerating rate setting overload control 9332a which is one of a pair of controllers in 9332 which carries out a deceleration operation at an overloading set decelerating rate $\Delta f_o^*$, while an overload condition is judged to be present. The fuzzy automatic overload control 9332b, on the other hand, automatically produces appropriate decelerating and accelerating rates such that the current limiting value IM may be maintained in the vicinity of the overload current limiting value $I_{lim}O$ thereby to execute acceleration and deceleration operation thereof.

(2.5 Switching Operation of Each Control Part in Acceleration and Deceleration Control Units)

As has been described above, deceleration and deceleration control unit 931 is made up of a plurality of control units and parts, and consequently either one of which is selected to be executed in accordance with a setting by the operator, or responsive to a detected current or voltage value corresponding to each time zone. Each condition for execution of these control units will be described with reference to FIG. 3 and the state transition diagram thereof.

Figure 3:
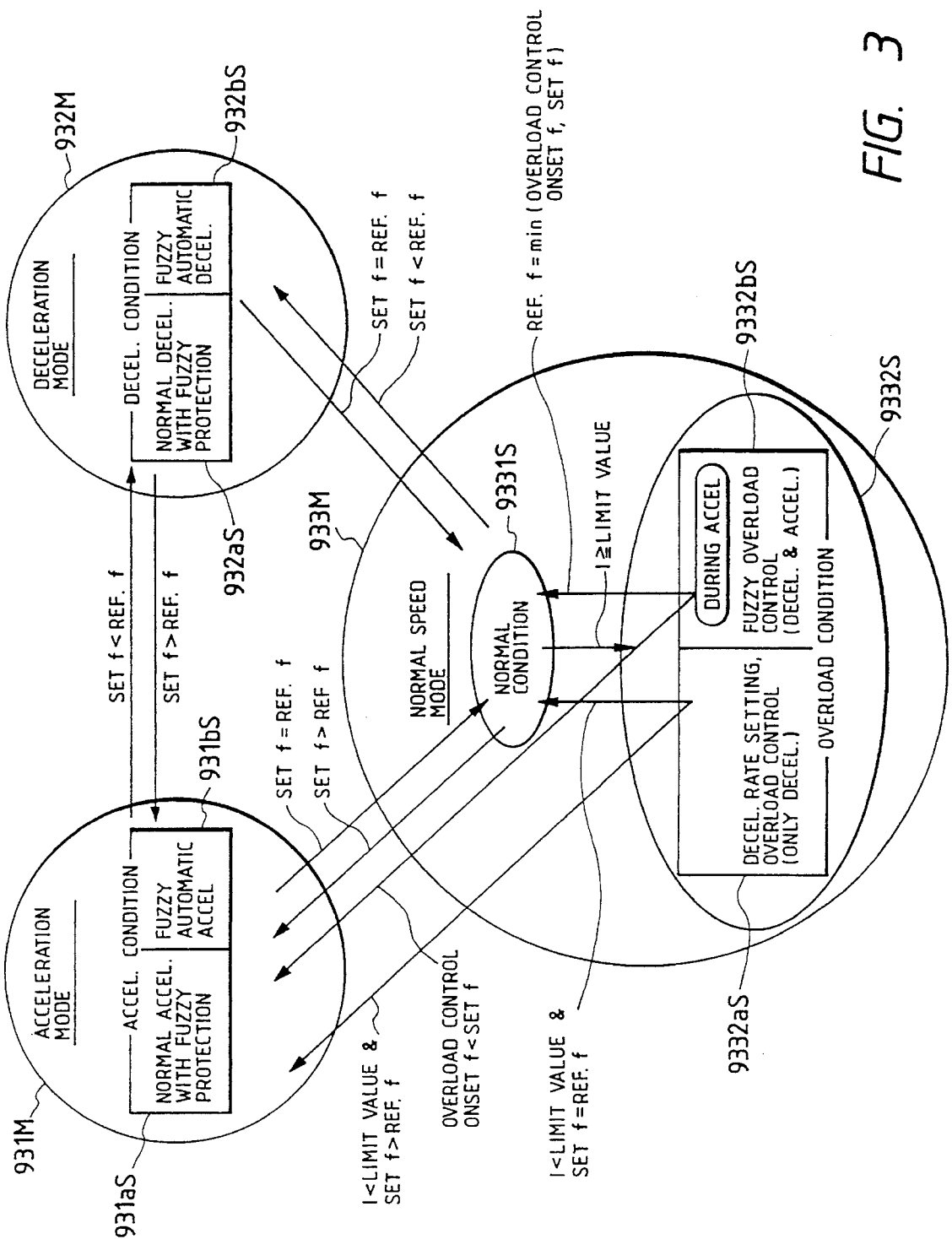
FIG. 3 is a state-transition diagram illustrative of the operational modes of one embodiment of the invention.

A symbol S attached to the ends of numerals in FIG. 3 indicates a particular state to be realized by a particular control unit shown in FIG. 1, while a symbol M likewise indicates a particular mode of operation which is selectable.

[Transition from the constant speed mode]

(1) Assume that the motor is in a constant speed mode 933M. In this mode, when the set frequency fr is set to be smaller than the reference frequency f1, the mode is caused to shift to a deceleration mode 932M irrespective of whether it is in the normal state or in the overload state. In a normal state 9331S in this constant speed mode and in particular where reference frequency f1 equals set frequency fr, when the set frequency fr is set at a value greater than the reference frequency f1, the mode is caused to shift to an acceleration mode 931M. Further, while in the normal state 9331S, when the detected current value IM is likely to exceed the boundary of the overload current limiting value $I_{lim}O$, the mode shifts to an overload state 9332S in the same constant speed mode.

(2) Next, assume that in an overload state 9332S, the decelerating rate setting overload control unit 9332a is selected so that an overload deceleration state 9332aS is in existence. Under such condition, if the detected current value IM is in the vicinity of and below the overload current limiting value $I_{lim}O$, and if the set frequency fr is greater than the reference frequency f1, the mode is caused to shift to the acceleration mode 931M, and if they are the same, the mode is caused to return to the normal state 9331S.

On the other hand, assuming that in the same overload state 9332S, the fuzzy overload control unit 9332b is selected, an overload acceleration/deceleration state 9332bS is in existence.

In this case, a state transition as to whether to shift to the acceleration mode or to the normal state mode, under the condition of the overload acceleration state, is determined according to an interrelationship between three related frequencies, including an overload control onset reference frequency $f1_oO$ at the onset of the overload control which was stored at the time of shifting from the normal state 9331S to the present state, the set frequency fr, and the reference frequency f1. Namely, the condition for returning to the normal state is when, in the overload acceleration running state, an increasing reference frequency becomes equal to either one of the overload onset reference frequency $f1_oO$ at the onset of the overload and the set frequency fr, whichever frequency is smaller. On the other hand, a transition condition to the acceleration mode is such that, in the same overload acceleration running state, the set frequency fr becomes greater than the overload control onset reference frequency $f1_oO$.

Figure 4A:
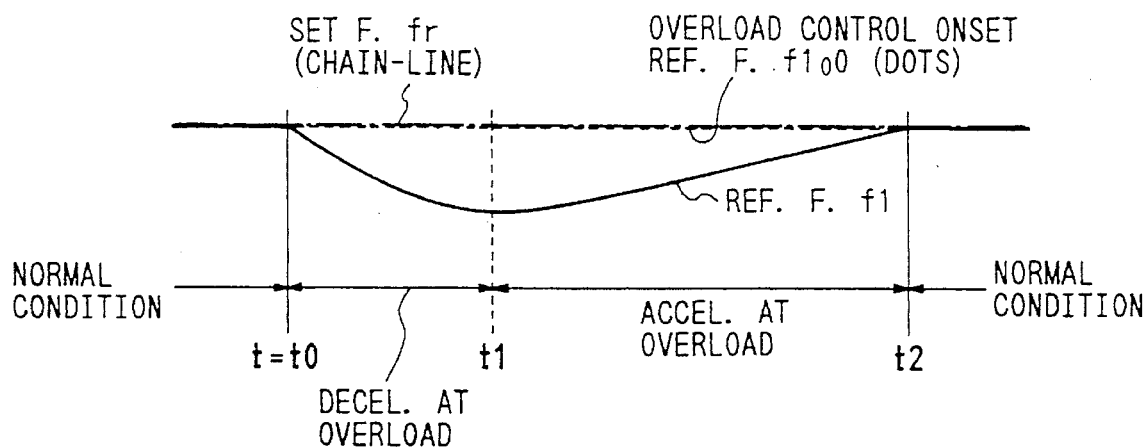
FIGS. 4(a) to 4(c) are diagrams to explain the operational modes of key components of one embodiment of the invention.
Figure 4B:
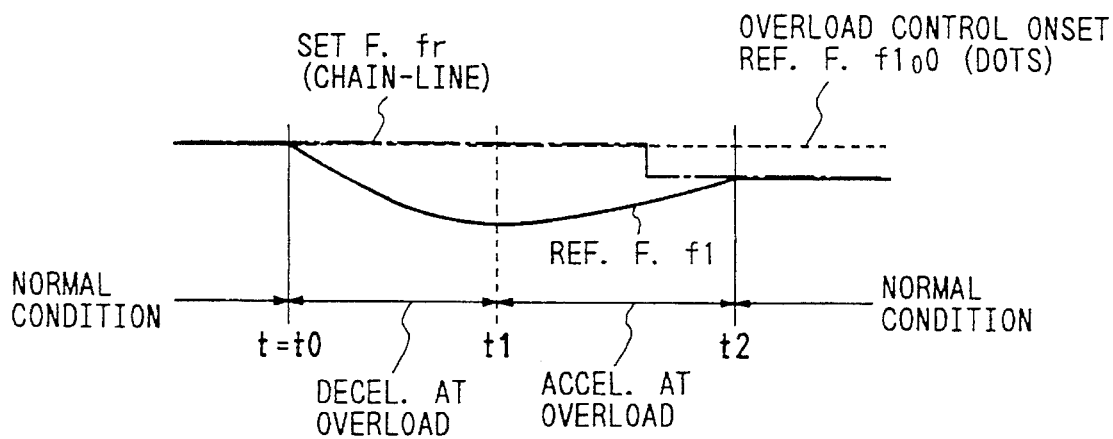
Figure 4C:
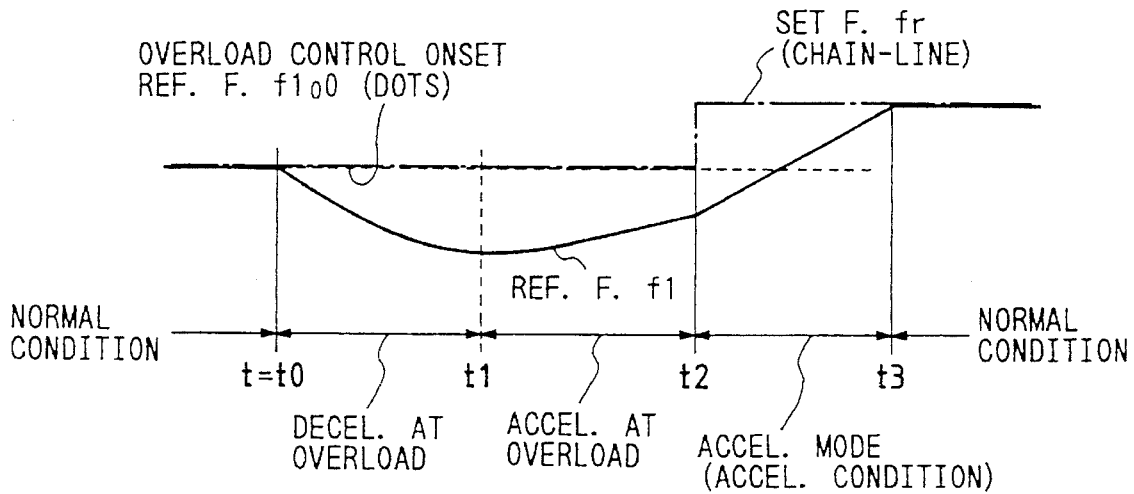

(3) The aspects of transition from the fuzzy overload control state 9332bS described above are shown in FIG. 4 as a function of time for the reference frequencies fr. With reference to FIGS. 4(a), 4(b) and 4(c), each state shifts from the normal state 9331S at t=t0 to the fuzzy overload control state 9332bS to assume the overload deceleration state, whereby each reference frequency is gradually decremented such that the detected current values IM will be maintained in the vicinity of the overload current limiting value $I_{lim}O$. Then, when each detected current value IM is on the decrease, since the load is decreased, the state shifts at t=t1 to the overload acceleration state, whereby the reference frequency f1 is gradually increased such that the detected current value IM may be maintained in the vicinity of the current limiting value $I_{lim}O$.

Now, at t=t2, depending on a greater or smaller relationship between the overload control onset reference frequency $f1_oO$ and the set frequency fr, one of the three different cases of (a) to (c) is optioned. That is, in a transition is such that in the case (a), the set frequency fr does not change during this overload control operation, but remains equal to the overload control onset reference frequency $f1_oO$, so that, when the reference frequency f1 becomes equal to these two frequencies which have remained equal, the state is caused to return to the normal state 9331S. FIG. 4(b) indicates the case where the set frequency fr is changed to be smaller than the overload control onset $f1_oO$ so that, when the reference frequency f1 becomes equal to this changed set frequency fr, the state returns to the normal state 9331S. Then, in the case of FIG. 4(c) where the set frequency fr is changed to be greater than the overload control onset reference frequency $f1_oO$, the state is caused to shift to the acceleration mode 931M immediately upon detection of the change of the set frequency fr.

[Transition from the Acceleration]

Next, assume that in the acceleration mode 931M, there exists either one of the acceleration states 931aS or 931bS realized by either one of the fuzzy-protection-provided normal automatic acceleration control 931a or the fuzzy automatic acceleration control 931b. Under such acceleration states, when the reference frequency f1 becomes equal to the set frequency fr, the mode is caused to shift to the constant speed mode. On the other hand, when the set frequency fr becomes smaller than the reference frequency f1, the mode shifts to the deceleration mode 932M.

[Transition from the Deceleration Mode]

Further, assume that in the deceleration mode 932M, there exists either one of the deceleration states 932aS or 932bS to be realized by either one of fuzzy-protection-provided normal deceleration control 932a or the fuzzy automatic deceleration control 932b. Under these deceleration states, when the reference frequency f1 becomes equal to the set frequency fr, the mode is caused to shift to the constant speed mode. On the other hand, when the set frequency fr becomes greater than the reference frequency f1, the mode is caused to shift to the acceleration mode 931.

{2.6 Relationships of The First and Second Current Limiting Values, and of the First through Third Voltage Limiting Values}

With reference to FIG. 1, various kinds of limiting values shown therein, i.e., accelerating time current limiting value $I_{lim}A$, decelerating time current limiting value $I_{lim}D$, overload current limiting value $I_{lim}O$ and voltage limiting value $V_{lim}$ are all appropriate respective limiting values are specified for insuring continuous operation of the inverter without stoppage thereof, and which are defined as the second limiting values, respectively. In addition to these second limiting values defined here, there are also defined first current or voltage limiting values, whereby, at the instant the current or voltage exceeds this point, the inverter is caused to stop its operation, or a third voltage limiting value which causes the brake 3 to operate when it is exceeded. These limiting values and their greater-and-smaller relationships will be described more specifically with reference to FIG. 5(a) and FIG. 5(b).

Figure 5A:
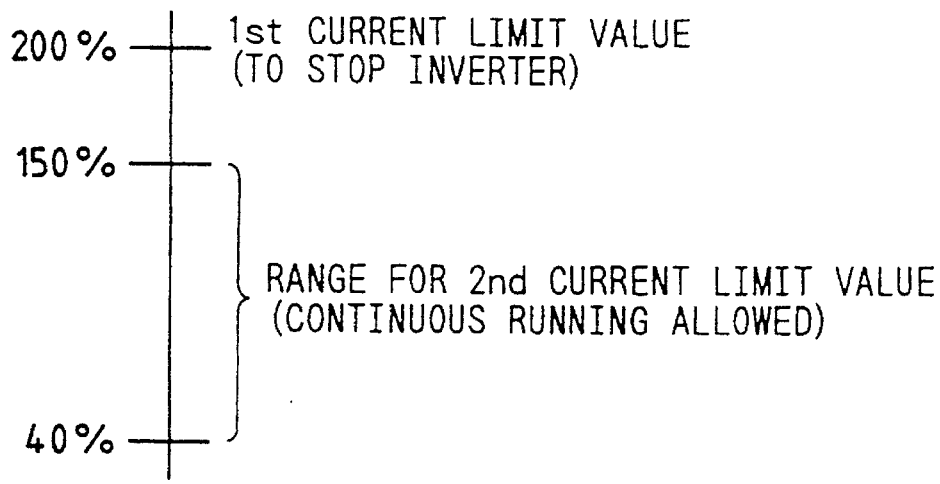
FIGS. 5(a) and 5(b) are diagrams showing current protection levels for one embodiment of the invention.
Figure 5B:
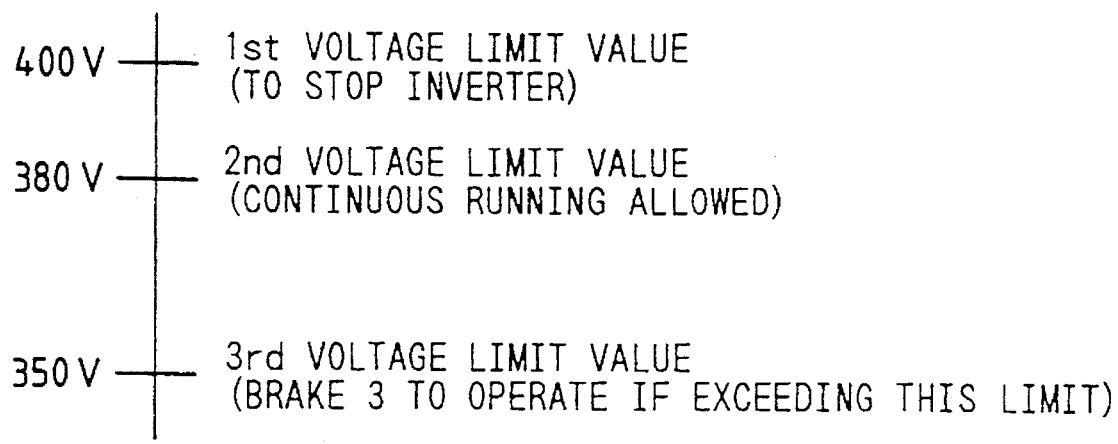

FIG. 5(a) specifies respective current limiting values. According to the present embodiment of the invention, with respect to a rated current of the inverter designated to be 100%, it is preferably specified that the first current limiting value be set at 200%, and the second current limiting value may be set below the first current limiting value in a range between 40% and 150%. Further, FIG. 5(b) indicates respective voltage limiting values. According to the present embodiment of the invention, preferably at 400 V the first voltage limiting values are set, likewise at 350 V the third voltage limiting value is set, and at 380 V, between the foregoing two limiting value is set.

{4. Common Items throughout the Fuzzy-control Assisted Five Control Units}

In accordance with the present invention, fuzzy control has been applied to each of the fuzzy-provided normal acceleration control unit 931a, fuzzy automatic acceleration control unit 931b, fuzzy-protection-provided normal deceleration 932a, fuzzy automatic deceleration control unit 932b and fuzzy overload control unit 9332b. Common items relevant throughout the fuzzy control units FZYB used in these control units will be described with reference to FIGS. 6 through 9. {4.1 Contents of Fuzzy Control Unit}

[Arrangements of Fuzzy Control Unit and its Peripherals]

Figure 6:
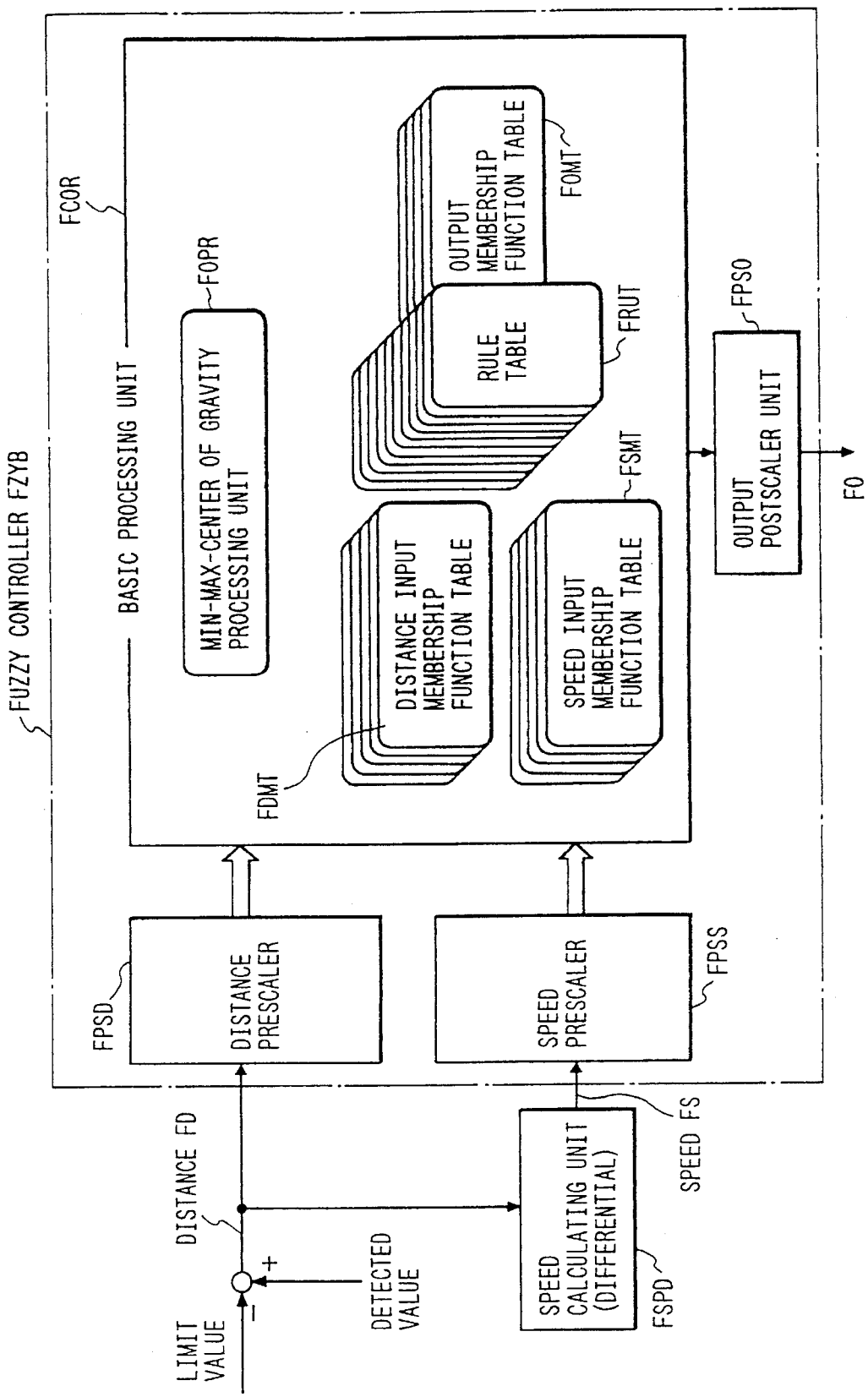
FIG. 6 is a schematic diagram of the fuzzy controller of one embodiment of the invention.

FIG. 6 shows the arrangements of the fuzzy control unit FZYB and its input side. As inputs to this fuzzy control unit FZYB there are a distance FD and a speed FS, and as its output there is a quantity FO relating to the reference frequency f1, such as accelerating/decelerating rates.

The distance FD refers to a deviation of a detected voltage or current value from its limiting value. On the other hand, the speed FS is calculated on the basis of differences in values taken in a plurality of samplings at respective time slots on the distance FD by a speed processing unit FSPD in a manner to be described later. Then, by this difference, an approach speed for a detected value approaching its limiting value is expressed. By way of example, this difference corresponds to a time differential in a continuous control system to be realized by analog circuits.

Inside the fuzzy control unit FZYB, on the input side, there are disposed a distance prescale unit FPSD and a speed prescale unit FPSS, and on the output side there is disposed a postscale unit FPSO, and therebetween there is a basic arithmetic processing unit FCOR. Each of the two prescale units FPSD and FPSS translates the distance or speed into a standardized number from 0 to 15 thereby to be input to the basic arithmetic processing unit FCOR, while the output postscale unit FPSO in turn transforms each value given in the standardized number from 0 to 15 to a corresponding quantity relating to frequency.

The basic arithmetic processing unit FCOR includes an arithmetic processing unit FOPR which executes a MIN-MAX-center-of-gravity processing, which is a well known technique of fuzzy processing, and the following four different tables, namely, a distance input membership function table FDMT, a speed input membership function table FSMT, a rule table FRUT, and an output membership function table FOMT.

[Speed Calculation Method]

The speed FS to be obtained in the speed processing unit FSPD is calculated by the following equation 1.

$$FSn=\{(FDn)-(FDn-2)+(FDn-1)-(FDn-3)\}/(4Ts) \quad \text{eq. 1}$$

Figure 7:
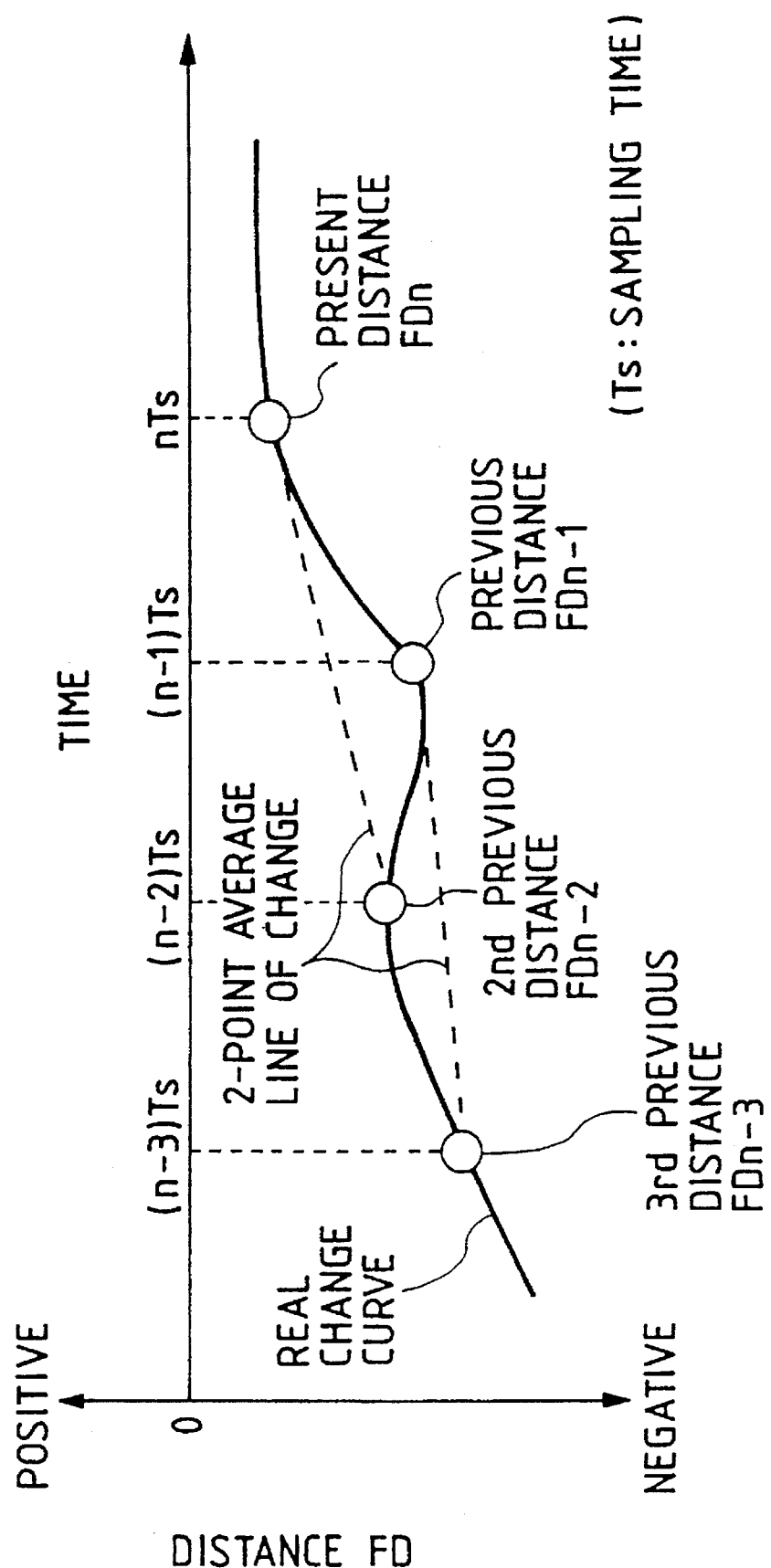
FIG. 7 is a diagram showing the speed computing method for the current or voltage according to the invention.

The meaning of the foregoing equation 1 will be described with reference to FIG. 7. Changes in the distance as a function of time are shown in FIG. 7. On the solid curve indicating actual changes, there are shown by circles respective distance data $FDn$, $FDn-1$, $FDn-2$ and $FDn-3$ each corresponding to the same marked data in equation 1. That is, respective distances at four respective sampling points of time Ts, i.e., from $nTs$ to $(n-3)Ts$, correspond to $FDn$ to $FDn-3$, respectively. Then, a speed $FSn$ is calculated by the above equation as an average of the two gradients of two dotted lines shown in the drawing: one drawn between the distance $FDn$ which was taken in the present sampling and the distance $FDn-2$ which was taken in before the previous or the 2nd previous sampling, and the other drawn in the same manner between the distance $FDn-1$ which was taken in the previous sampling and the distance $FDn-3$ which was taken in before the second previous or the third previous sampling.

[Contents of the Table]

Next, by way of the example of FIG. 8, the contents of the four tables will be described in detail.

Figure 8:
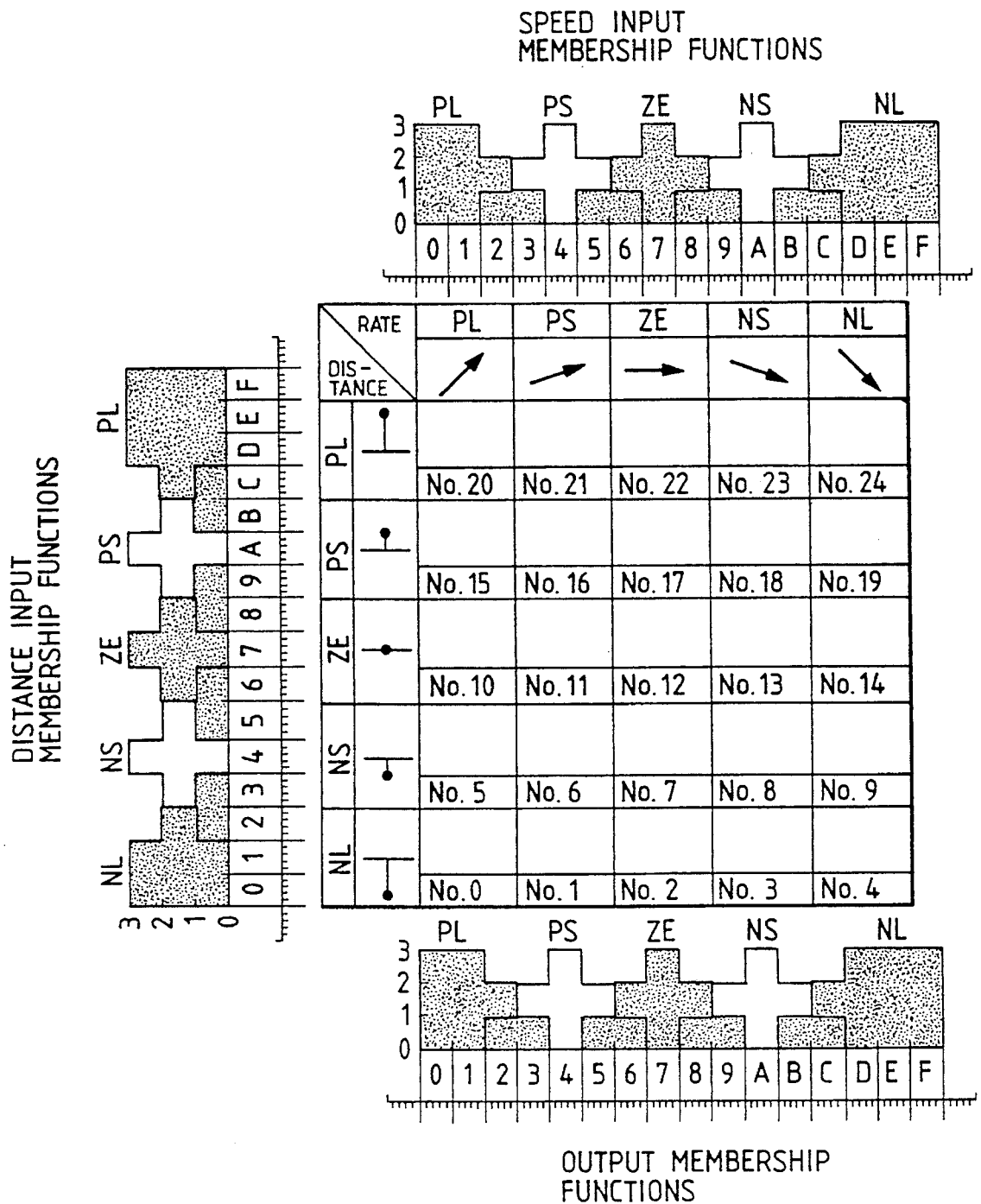
FIG. 8 is a diagram illustrative of the membership functions and rule expressions to be used in the fuzzy controller of one embodiment of the invention.

In FIG. 8, there is shown a rule table in the center of the drawing, having five different speed input membership functions indicated by symbols PL, PS, ZE, NS, NL on the upper portion thereof, five different distance input membership functions on the left-hand side thereof, and also five different output membership functions on the bottom thereof. Then, these three sets of membership functions of distance inputs, speed inputs and outputs are tabled under a corresponding table name to constitute FDMT, FSMT and FOMT, respectively. Here, with respect to the distances of the fuzzy processing units inside the fuzzy automatic acceleration unit 931b and the fuzzy automatic deceleration unit 932b, six functions are provided with an addition of NLL.

[Rule Expressions and Membership Functions]

In the rule table shown in FIG. 8, having blocks from No. 0 to No. 24, each block defines one of the five different output membership functions, PL, PS, ZE, NS, and NL for five respective fuzzy computations to be executed by the acceleration/deceleration control unit 93. Further, there are provided thirty rules for the fuzzy computing units inside the fuzzy automatic acceleration unit 931b and the fuzzy automatic deceleration unit 932b, which will be described in detail with respect to each control unit to be discussed later.

On the other hand, the membership functions are expressed to take four levels from 0 to 3.

{4.2 Conditions for Executing Fuzzy Control Units}

With reference to FIG. 9, there are shown five different conditions for the five different fuzzy control units to execute their tasks corresponding to the respective control units to which they belong.

(1) During the execution of the fuzzy automatic acceleration unit, fuzzy automatic deceleration unit and fuzzy automatic overload control unit, the fuzzy control units FZYBs thereof are always executed.

(2) In the remaining portions of the fuzzy-protection provided normal acceleration unit and the fuzzy-protection-provided normal deceleration units, the two fuzzy control units FZYBs have the same conditions to complete or exit from the routine as those of the control units to which they belong. On the other hand, a start condition for enabling their execution is when the distance is less than 0 or likely to be less than 0, that is, when the detected value is already above its limiting value or a predicted value to be detected at a later k-th sampling is predicted to become greater than the limiting value.

(3) A predicted distance value $FDn+k$ after the k-th sampling is calculated by the following equation.

$$FDn+k=(FSn)\cdot(kTs)+(FDn) \quad \text{eq. 2}$$

Figure 10:
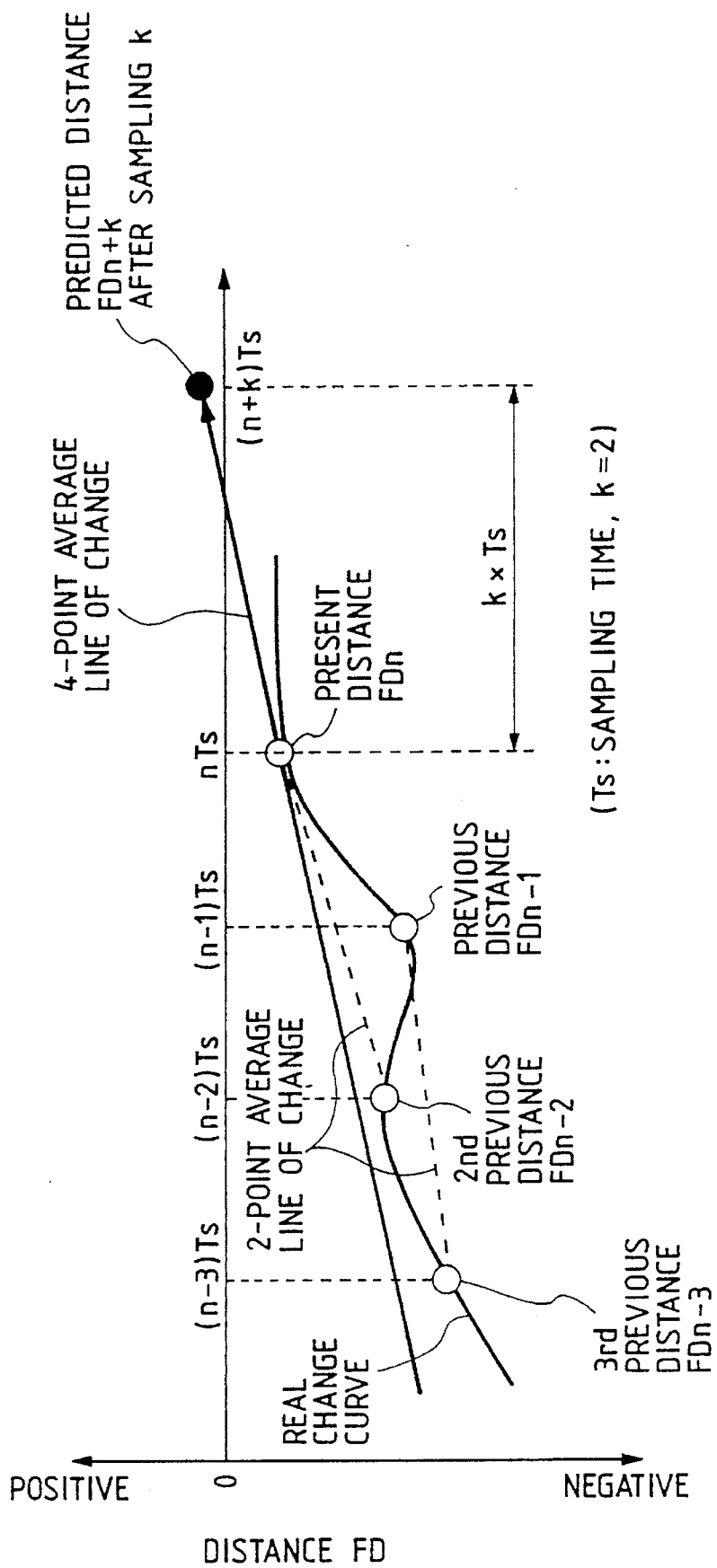
FIG. 10 explains the distance prediction method for the current or voltage according to one embodiment of the invention.

FIG. 10 shows an example using a four-point average line of changes drawn in addition to FIG. 7. Namely, by assuming that, at a gradient of a speed $FSn$, calculated at the time of the n-th sampling by eq. 1, the distance will keep changing until after the k-th sampling, a predictive distance after the $kTs$ period of time is calculated by equation 2. By way of example, in the same drawing, an example for establishing the execution condition is illustrated by assuming that k=2, and a detection value will exceed its limiting value, thereby the predicted distance will become positive.

{5. Detailed Descriptions of Respective Control Units}

Each of the five control units including the fuzzy protected normal acceleration unit 931a, fuzzy-protected automatic acceleration unit 931b, fuzzy-protected normal deceleration unit 932a, fuzzy automatic deceleration unit 932b and fuzzy overload control unit 9332b which applies the fuzzy control of the invention will be described in detail in the following.

{5.1     Fuzzy-Protection-Provided     Normal Acceleration}(Control Architecture)

Figure 11:
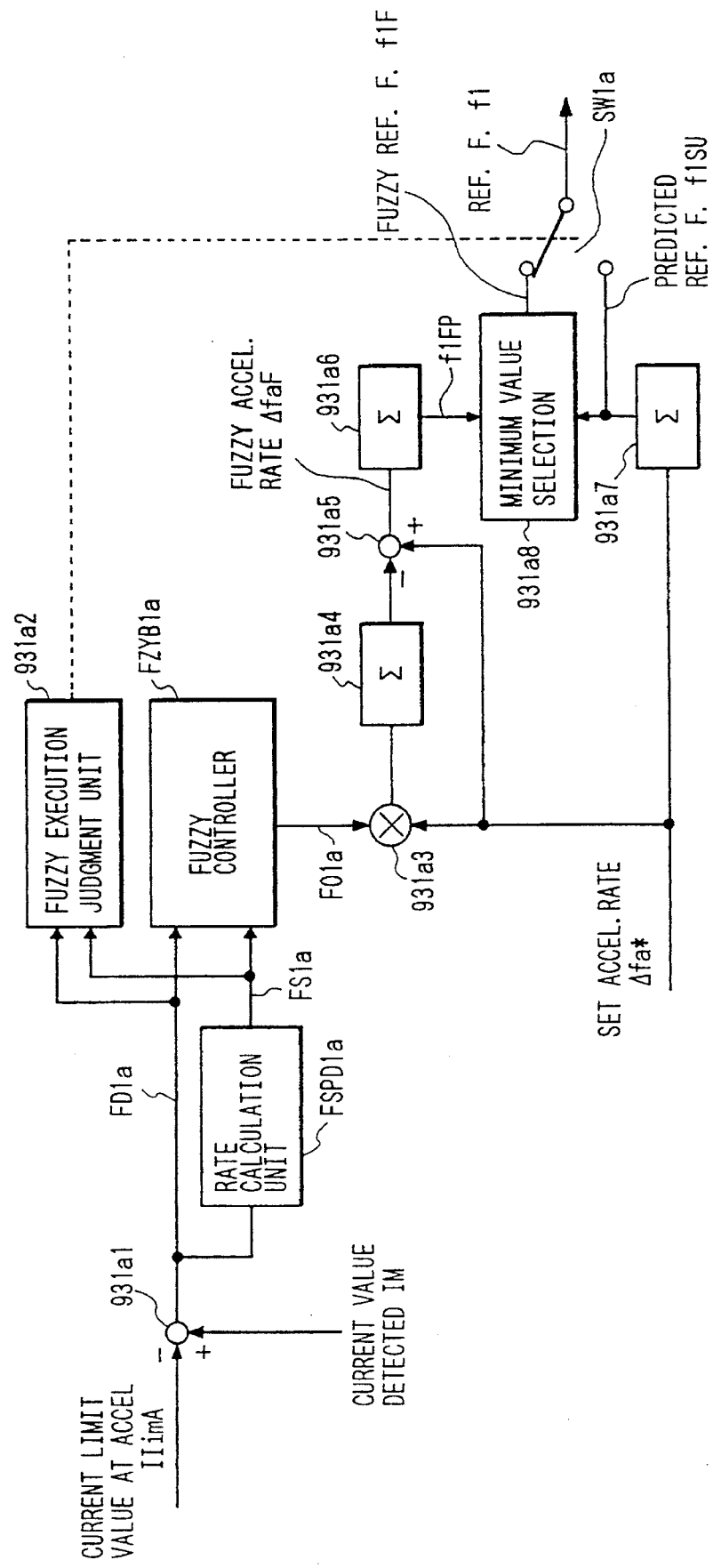
FIG. 11 is a schematic diagram of the normal acceleration control with the fuzzy protection of one embodiment of the invention.

The fuzzy-protection-provided or fuzzy-protected normal acceleration unit 931a has an arrangement as shown 31 in FIG. 11 having the fuzzy control unit FZYB1a described in FIG. 6 in the central portion and other associated parts in the periphery thereof. Inputs to this fuzzy control unit include a distance FD1a between the detected current value IM and the current limiting value $I_{lim}A$ during acceleration, and a speed FS1a from the speed processing unit FSPD1a produced in the manner described with reference to FIG. 7. Using the same inputs as described above, the fuzzy execution judgment unit 931a2 executes a judgment processing to determine the execution conditions already described in FIGS. 9 and 10. However, in FIG. 11, the execution of this fuzzy control unit FZYB1*a* is expressed by way of example as follows.

When the fuzzy control unit FZYB1*a* is not executing, a hypothetical reference frequency f1SU is selected as an actual reference frequency f1. This f1SU is obtained by integrating a set accelerating rate Δfa* in an integrator 931*a*7 in accordance with the following equation 3. Once the execution condition is established, switch SW1*a* is switched, as shown in FIG. 11, in response to an output from the fuzzy execution judgment unit 931*a*2, with the result that a fuzzy reference frequency f1F which was produced through the fuzzy control unit FZYB1*a* is selected as the reference frequency f1. A value sampled at a subsequent i-th sampling is shown with (i) added to the end of each symbol hereinafter.

$$f1SU = \Delta fa^*(n) + f1F(n-1) \qquad \text{eq. 3}$$

where f1SU: an output of the integrator 931*a*7.
(Equation of the Reference Frequency)

An output FO1*a* from the fuzzy control unit FZYB1*a* is further processed in conjunction with the set accelerating rate Δfa* and the hypothetical reference frequency f1SU by means of a multiplier 931*a*3, two integrators 931*a*4 and 931*a*6, and an adder 931*a*5 to produce the fuzzy reference frequency f1F, in accordance with the following equations 4 through 6.

$$\Delta faF(n) = \Delta fa^* - \text{sum}\{(\Delta fa^*) \times FO1a(i)\} \qquad \text{eq. 4}$$

where ΔfaF(n) is an output from the adder 931*a*5 (a fuzzy accelerating rate).

$$f1FP = \Delta faF(n) + f1F(n-1) \qquad \text{eq. 5}$$

where f1FP is an output from the integrator 931*a*6.

$$f1F(n) = \min(f1SU(n), f1FP(n)) = f1(n) \qquad \text{eq. 6}$$

where f1F(n) is an output from a minimum value selector 931*a*8 (fuzzy reference frequency).

Namely, the fuzzy accelerating rate ΔfaF in eq. 4 is generated in such a manner that a fuzzy control unit output FO1*a* is multiplied by the set accelerating rate Δfa*, and is added to the previous value every time it is sampled, the sum of which is subtracted from the set accelerating rate. Then, this fuzzy accelerating rate is added up to the previous reference frequency tentatively to produce a prescaler fuzzy reference frequency f1FP using equation 5. However, at the time of sampling, when the prescaler fuzzy reference frequency f1FP is judged to be greater than the hypothetical reference frequency f1SU, the hypothetical reference frequency is selected as the reference frequency f1 by equation 6.

(Rules)

The rules to be used in the fuzzy control unit FZYB1*a* are shown more specifically in FIG. 12. In the drawing, for example, a rule No. 20 expresses "in case the distance is PL and the speed is PL, then the output is PL". This means "in case the detected current value exceeds its limiting value greatly and the current is going to increase greatly, then decrease the accelerating rate greatly" (so indicated by a downward arrow with a large width).

Namely, according to this rule No. 20, a fuzzy output value of FO1*a* with a positive sign and a relatively large magnitude as its absolute value is selected, taking into account a relationship with the other rules Nos. 15, 16 and 21, which surround the rule No. 20. As a result, the fuzzy accelerating rate ΔfaF output from the adder 931*a*5 by equation 3 is decreased, thereby lowering the accelerating rate.

(Operations)

Figure 13:
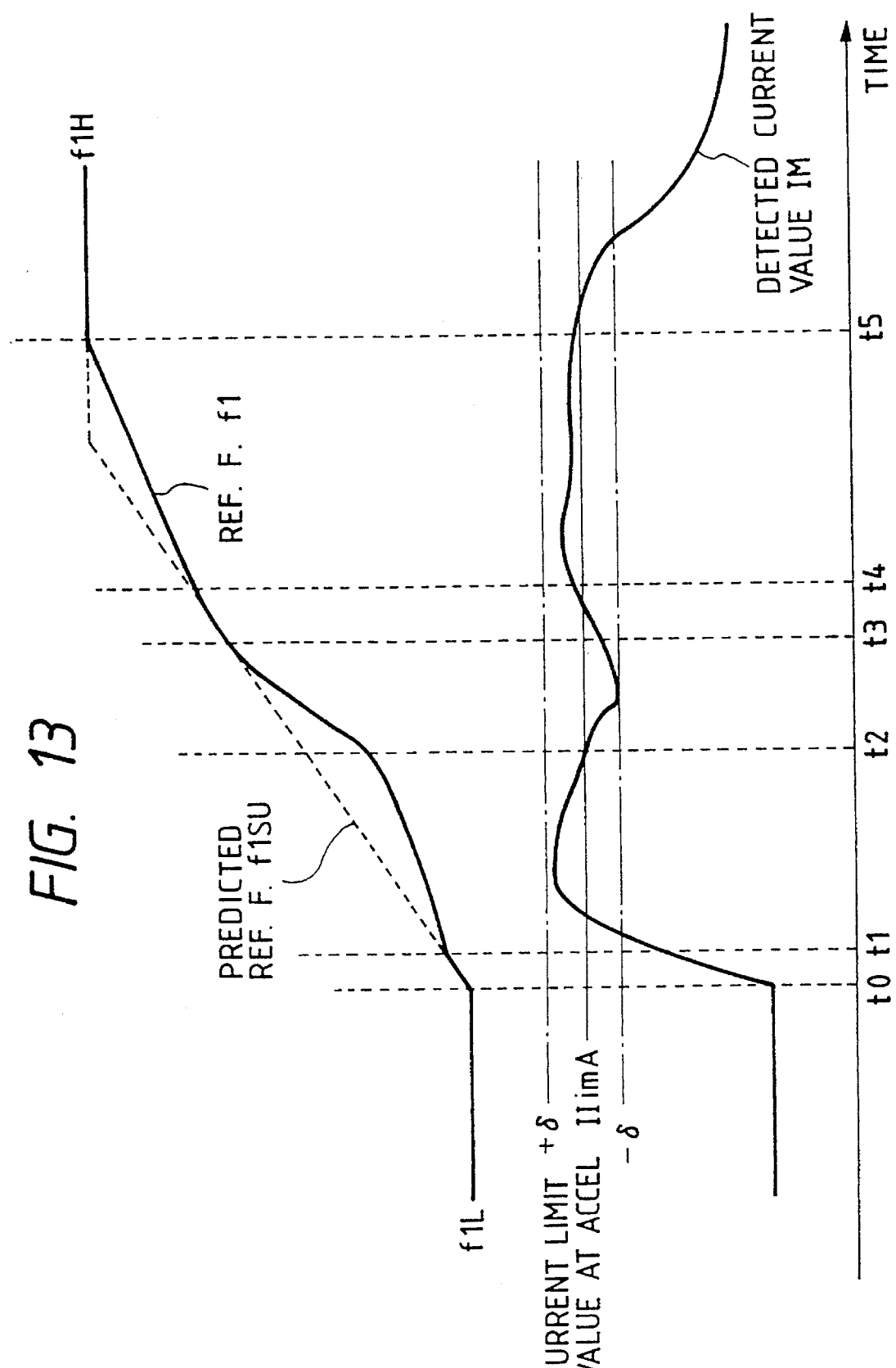
FIG. 13 is a diagram which shows operations of the fuzzy protection normal acceleration unit of one embodiment of the invention.

Next, with reference to FIG. 13, changes taking place with time in the detected current values and the reference frequencies will be described. In FIG. 13, a range in terms of distance between $(I_{lim}A-\delta)$ and $(I_{lim}A+\delta)$ including an acceleration current limiting value $I_{lim}A$ in the center thereof is addressed as an extent to be covered by the fuzzy control, and is divided into sixteen levels from 0 to 16 in the distance prescaler FPSS inside the fuzzy control unit.

Assume that, during operation according to a reference frequency f1L, the mode has shifted to an acceleration mode at time t0. At an initial stage of the acceleration, the reference frequency increases at a set accelerating rate, and accordingly the detected current value increases rapidly. Assume that, at a time t1, the fuzzy control unit is executed through a predictive computing for the current. In this case, the fuzzy accelerating rate is selected so as to increase the accelerating rate ΔfaF, thereby slackening the increase in the reference frequency. The degree of its change depends on the magnitude of the increment of the detected current value and the degree of the distance to the current limiting value $I_{lim}A$.

After time t2 to time t4, since the current has taken a downward decreasing curve, the accelerating rate is turned to increase once again. However, in a time zone from time t3 to time t4 it is assumed that a corresponding fuzzy reference frequency calculated for that time zone was anticipated to exceed the predicted reference frequency, and thereby that the predicted reference frequency is selected as the reference frequency.

At time t5, the reference frequency f1 rises to coincide with the set frequency fr which is equal to f1H, thereby exiting from the acceleration mode.

{5.2 Fuzzy Automatic Acceleration}
(Controller Arrangement)

Figure 14:
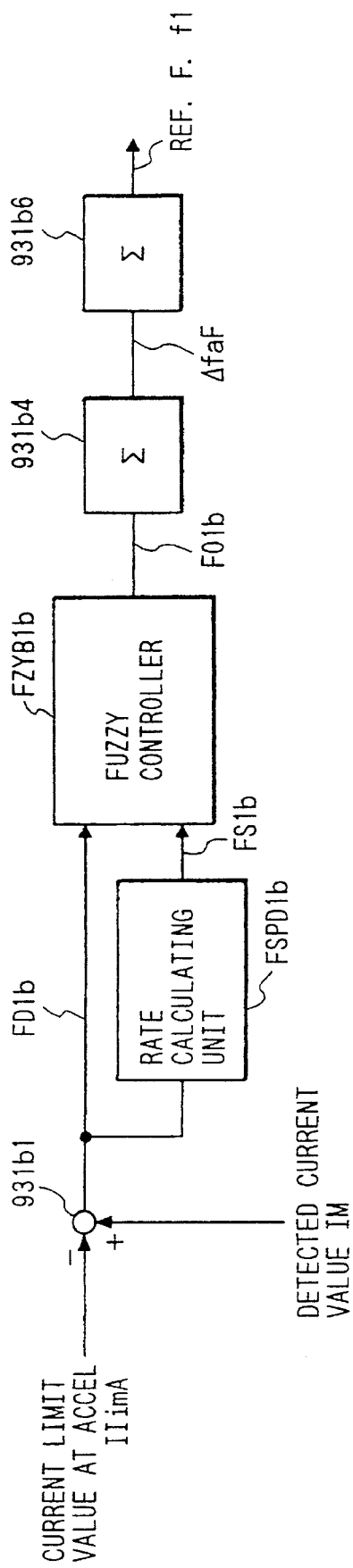
FIG. 14 is a schematic diagram of the fuzzy automatic acceleration control unit of one embodiment of the invention.

The fuzzy automatic acceleration unit 931*a* has an arrangement as shown in FIG. 14. Inputs to the fuzzy control unit FZYB1*b*, which is a key component thereof, include a distance FD1*b* between the detected current value IM and the current limiting value $I_{lim}A$ during acceleration, and a speed FS1*b* produced in the speed processing unit FSPD1*b*. Further, in this fuzzy automatic acceleration unit, its fuzzy control unit is always executed to produce an output FO1*a* which is then integrated in the integrator 931*b*4 to produce a fuzzy accelerating rate ΔfaF which is integrated in the integrator 931*b*6 in turn to produce an appropriate update reference frequency f1. ΔfaF and f1 at the time of n samplings are given by the following equation 7, respectively.

(Equation of Reference Frequency)

$$\Delta faF(n) = FO1b(n) + \Delta faF(n-1)$$

where ΔfaF(n): an output from the integrator 931*b*4, $$f1(n) = \Delta faF(n) + f1(n-1) \qquad \text{eq. 7}$$

where f1(n): an output from the integrator 931*b*6 (Reference Frequency).

(Rules)

Now, with reference to FIG. 15, specific rules to be utilized within the fuzzy control unit FZYB1*b* are shown in the drawing. As described above, there are six kinds of membership functions with respect to the distance for the fuzzy automatic acceleration unit, thereby providing thirty rules in all to be defined. For example, a rule No. 25 expresses "in case the distance is PL and the speed is PL, then the output should be NL". This means "when the detected current value exceeds its limiting value to a substantial extent and the current is likely to increase greatly, then the accelerating rate should be decreased greatly in accordance".

Namely, in this rule No. 25, by taking into account a relationship with the other rules 20, 21, and 26 juxtaposed thereto, an update fuzzy output FO1b having a negative sign and a value larger as magnitude in its absolute value is selected. As a result, the fuzzy accelerating rate ΔfaF which is an output from the integrator 931b decreases thereby lowering the accelerating rate accordingly.

(Operations)

Figure 16:
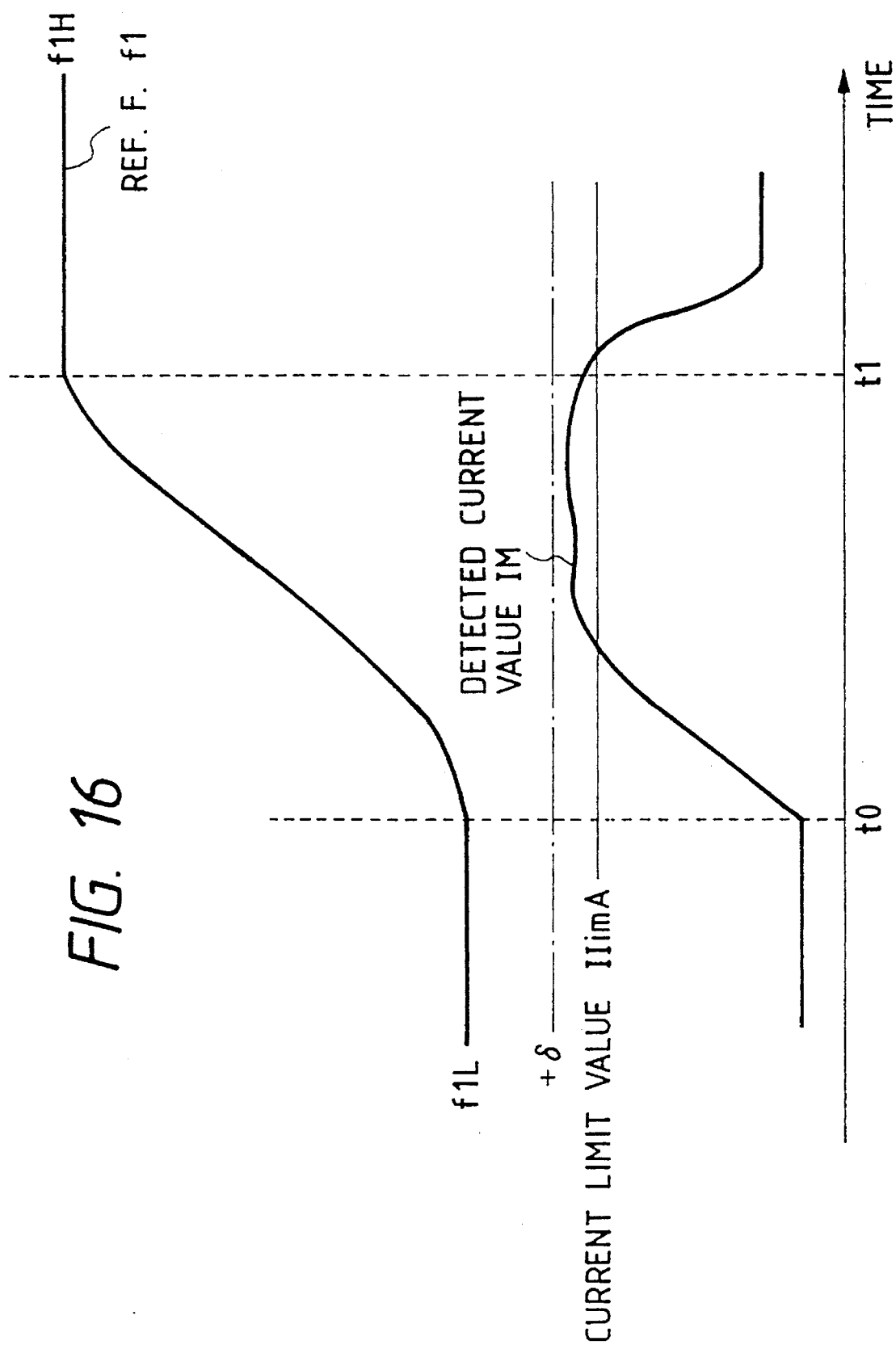
FIG. 16 is a diagram which explains operations of the fuzzy automatic accelerating unit of the invention.

Next, with reference to FIG. 16, changes with time of the detected current value IM and the reference signal f1 will be described. It has been indicated with respect to FIG. 13 that the range below the upper level ($I_{lim}A+\Delta$) is the range of the distance to be covered by the fuzzy control, and the range is divided into sixteen levels from 0 to by the distance prescale unit FPSS in the fuzzy control unit.

Assume that while operating on a reference frequency f1L, at a time $t_0$, the mode is caused to shift to an acceleration mode and simultaneously the fuzzy control unit is executed. At first, a rapid rise of current is prevented from occurring by effecting gradual acceleration mainly in accordance with the rules Nos. 1, 2, 6, 7. Then, when the detected current value IM rises to the vicinity of the current limiting value $I_{lim}A$, a fuzzy accelerating rate ΔfaF appropriate for maintaining the detected current value in the vicinity of the limiting value is automatically determined according to the rules.

At a time t1, the reference frequency f1 rises to coincide with the set frequency f* which is equal to f1H, thereby exiting from the acceleration mode.

(Implementation of the Fuzzy-protected Normal Acceleration)

In the arrangement of fuzzy-protected normal acceleration unit 931a described with reference to FIG. 11, the set accelerating rate Δfa* was used to produce the fuzzy accelerating rate ΔfaF. However, it is not limited thereto, and the fuzzy automatic acceleration 931a, the arrangement of which is indicated in FIG. 14, may be modified to implement the same effect of the invention. Namely, in addition to the arrangement of FIG. 14, the execution condition for executing the fuzzy control unit may be modified to adapt to that which has been described above in the fuzzy-protected normal acceleration, and also the reference frequency generated in the fuzzy side (fuzzy reference frequency) may be compared with the predicted reference frequency to option an appropriate reference frequency, whichever it is smaller.

{5.3 Fuzzy-protected Normal Deceleration: Selection Method}

For a suitable frequency control during deceleration, it is necessary to protect both the current and voltage. Thereby, there are provided two different fuzzy control units for the deceleration operation so that in combination an appropriate frequency is determined. Examples of such combinations will be described by way of example with respect to two types of methods: a selection type and a series type, the former as applied to the fuzzy-protected normal deceleration, and the latter as applied to a fuzzy automatic deceleration, which will be described later. Alternative combinations, that is, the fuzzy-protected normal acceleration applied to the series method, and the fuzzy automatic deceleration to the selection method, will also be possible.

(Controller Arrangement)

Figure 17:
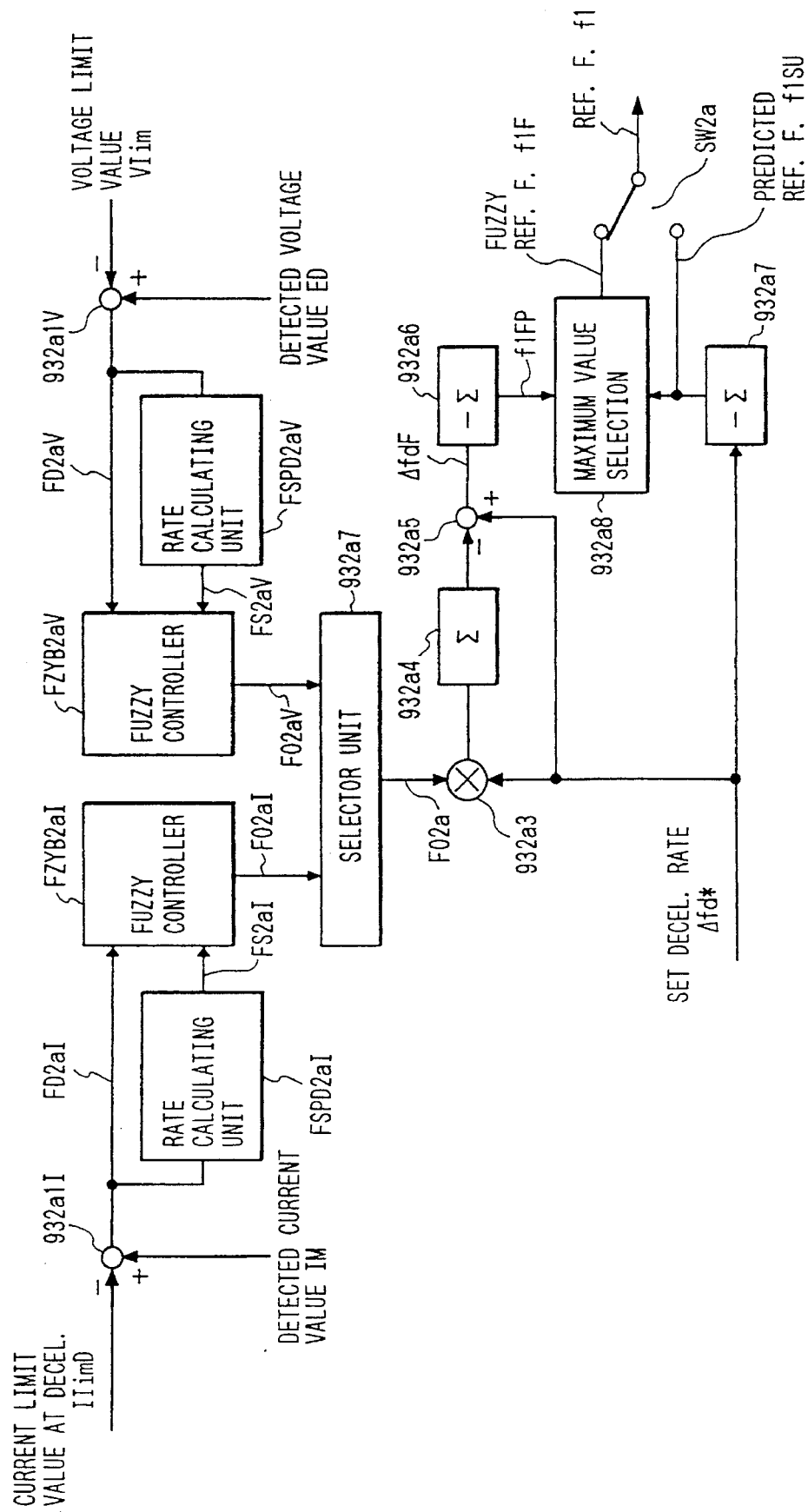
FIG. 17 is a schematic diagram of the normal deceleration control unit with the fuzzy protection according to one embodiment of the invention.

A schematic diagram of the fuzzy-protected normal deceleration unit, which is applied to the aforementioned selection method, is shown in FIG. 17. According to this selection method, either one of the outputs from the current side fuzzy control unit and the voltage side fuzzy control unit is selected so that its decelerating rate may be modified to the safety operating side.

Inputs to the current side fuzzy control unit FZYB2aI on one side include a distance FD2aI which is a difference between the detected current value IM and the decelerating time current limiting value $I_{lim}D$, and a speed FS2aI, which is produced by a speed processing unit FSPD2aI on the basis of the aforementioned difference. Inputs to the voltage side fuzzy control unit FZYB2aV on the other side include a distance FD2aV, which is a difference between the detected voltage value ED and the voltage limiting value $V_{lim}$, and a speed FS2aV, which is produced by a speed processing unit FSPD2aV on the basis of the aforementioned distance FD2aV. Then, respective outputs FO2aI and FO2aV from these two fuzzy control units are both input to a selection unit 932a7 which in turn produces an output FO2a.

The executions that the fuzzy control units carry out are the same as described in FIG. 9, however, here it is assumed that when an execution condition on either the side of the current or voltage is established, both fuzzy control units are enabled to execute their fuzzy functions. The execution judgment unit is omitted from FIG. 17 for simplification of the drawing.

When neither of the two fuzzy control units FZYB2aI and FZYB2aV is executed, the hypothetical reference frequency f1SU is selected as an actual reference frequency f1. This f1SU is reference frequency obtained, as shown in the bottom right-hand side in FIG. 17, by negatively integrating the set decelerating rate Δfd* in an integrator 932a7 according to the following equation 8. Then, once the execution condition is established, switch SW2a is switched as shown in FIG. 17 so that the reference frequency f1F produced on the basis of the output FO2a from the selector unit 932a7 will be selected as the reference frequency f1.

$$f1SU = -\Delta fa^*(n) + f1F(n-1) \qquad \text{eq. 8}$$

where f1SU: output from the integrator 932a7.

(Equation of Reference Frequency)

The output FO2a from the selector unit 932a7 is processed using the set decelerating rate Δfd* and the predicted reference frequency f1SU by means of a multiplier 932a3, two integrators 932a4 and 932a6, and an adder 932a5 into the reference frequency f1F in accordance with the following equations 9 to 11.

$$\Delta fdF(n) = \Delta fd^* - \text{sum}\{(\Delta fd^*) \times FO2a(i)\} \qquad \text{eq. 9}$$

where ΔfdF(n): output from the adder 932a5 (fuzzy decelerating rate).

$$f1FP = -\Delta fdF(n) + f1F(n-1) \qquad \text{eq. 10}$$

where f1FP: output from the integrator 932a6 (prescaler fuzzy reference frequency).

$$f1F(n) = \max(f1SU(n), f1FP(n)) = f1(n) \qquad \text{eq. 11}$$

where f1F(n): output from the maximum value selector 932a8 (fuzzy reference frequency).

Namely, output FO2a from the selector is multiplied by set decelerating rate Δfd*, the result of which is added to the previous value for every time of sampling, which is then subtracted from the set accelerating rate to generate fuzzy decelerating rate ΔfdF (equation 9). Then, this decelerating rate is negatively added to the previous reference frequency to generate a prescaler fuzzy reference frequency f1FP tentatively (eq. 10). However, at the time of its sampling, if the prescaler fuzzy reference frequency f1FP is smaller than the hypothetical reference frequency f1SU, then the hypothetical reference frequency is chosen as the reference frequency f1 instead (eq. 11).

(Selection Method)

As can be seen from FIG. 9, the greater the value of FO2a (inclusive of sign), the smaller the decelerating rate becomes. Therefore, the selector 932a7 is adapted to select one of the outputs FO2aI from the current side fuzzy control unit FZYB2aI and FO2aV from the voltage side fuzzy control unit FZYB2aV, whichever is greater.

(Rules)

Specific rules to be used within the current side fuzzy control unit FZYB2aI are shown in FIG. 18. In the same drawing, a rule No. 20, for example, expresses "in case the distance is PL and the speed is PL, then the output should be PL", which means "in case the detected current value exceeds its limiting value to a large extent and also the current is on a substantial increase, then the decelerating rate should be decreased immediately to a substantial extent".

On the other hand, specific rules to be used within the voltage side fuzzy control unit FZYB2aV are shown in FIG. 19. In the same drawing, a rule No. 20, for example, indicates "in case the distance is PL and also the speed is PL, then the output should be PL", which means "in case the detected voltage value exceeds its limiting value greatly, and also the voltage is on the substantial increase, then the decelerating rate should be decreased immediately to a substantial extent".

(Operations)

Figure 20:
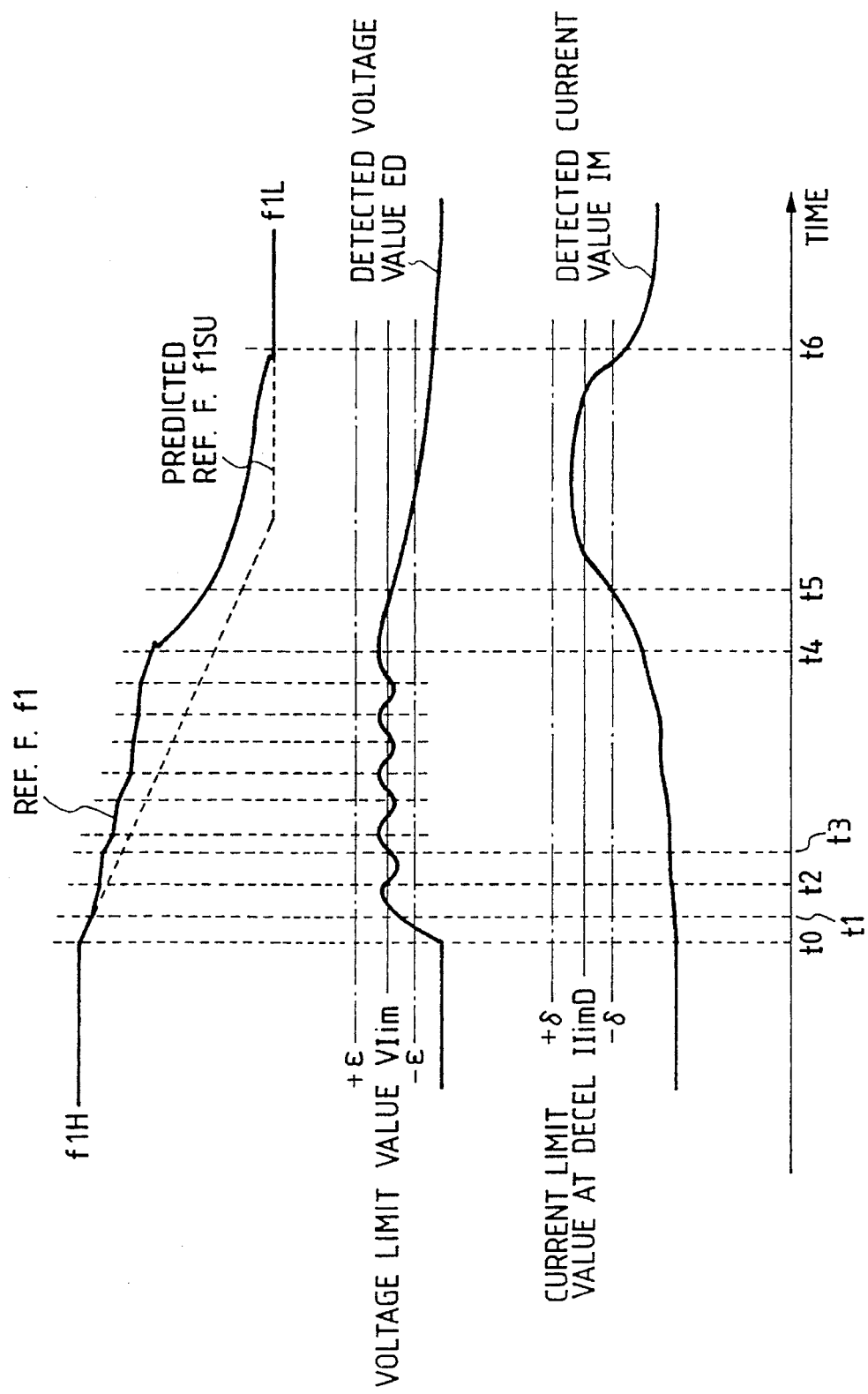
FIG. 20 illustrates the operations of the normal deceleration unit with the fuzzy protection according to the invention.

Next, with reference to FIG. 20, changes with time of the detected voltage values, detected current values, and reference frequencies will be described below. In FIG. 20, a range between $(I_{lim}D-\delta)$ and $(I_{lim}D+\delta)$ around a decelerating current limiting value $I_{lim}D$ in the center therebetween is defined as the range of distance to be covered by the current side fuzzy control, which is divided into sixteen levels from 0 to 15 by the distance prescaler FPSS within the fuzzy control unit. However, a range below $(I_{lim}D-\delta)$ is included in the level 0, and a range above $(I_{lim}D+\delta)$ is included in the level 15. Likewise, a range between $(V_{lim}-\epsilon)$ and $(V_{lim}+\epsilon)$ around a voltage limiting value $V_{lim}$ in the center therebetween is defined as the range of distance to be covered by the voltage side fuzzy control, which is divided into sixteen levels from 0 to 15 by the distance prescaler FPSS within the fuzzy control unit. However, a range below $(V_{lim}-\epsilon)$ is included Ln the level 0, and a range above $(V_{lim}+\epsilon)$ is included in the level 15. The following description will be made on the presumption that the brake 3 shown in FIG. 2 is not working.

Assume that while operating at a set frequency f1=f1H, at a time $t_0$, the mode is shifted to the deceleration mode. At the initial stage of deceleration, the reference frequency decreases gradually at a set decelerating rate, however, along with this decrease, the detected voltage value increases abruptly. Assume that at a time t1, the fuzzy control unit starts its execution on the basis of a predictive computing of the voltage. Thereby, a fuzzy decelerating rate produced on the voltage side is selected so as to decrease the decelerating rate ΔfdF, thereby slowing down the drop of the reference frequency until it appears that the drop substantially stops. As a result, from a time t2 the voltage turns to take a decreasing curve (power running), and then, from a time t3, the decelerating rate increases once again, thereby causing the voltage to rise again (regeneration running). Namely, in response to a continuous adjustment of the decelerating rate, alternating increases and decreases of the voltage due to regeneration running and power running are repeated so as to safely decelerate the motor.

Afterwards when the mechanical inertial energy decreases to a value which is small enough along with the drop of the voltage any more due to the regeneration running even if a large decelerating rate is adopted (since the inertial energy is consumed as mechanical loss and inverter loss), thereafter allowing correction and adjustment of the acceleration and decelerating rate from the current side. In FIG. 20, such a phenomenon is shown as taking place from time t4 to t5. Thereby, the deceleration continues depending on the magnitude of the detected current value until a time t6 where the reference frequency f1 rises to coincide with the set frequency fr=f1L, thereby to exit from the deceleration mode. Further, although it is not indicated in FIG. 20, in any event, even if the reference frequency f1 is caused to drop abruptly to a great extent, it never goes down below the hypothetical reference frequency f1SU and is maintained above that level through operation of the maximum value selector 932a8.

{5.4 Fuzzy Automatic Deceleration: Series Method}

The fuzzy automatic deceleration unit 932a will be described in the following by way of example of a series method in which the voltage side fuzzy controller and the current side fuzzy controller are connected in series as mentioned above.

(Controller Arrangement)

Figure 21:
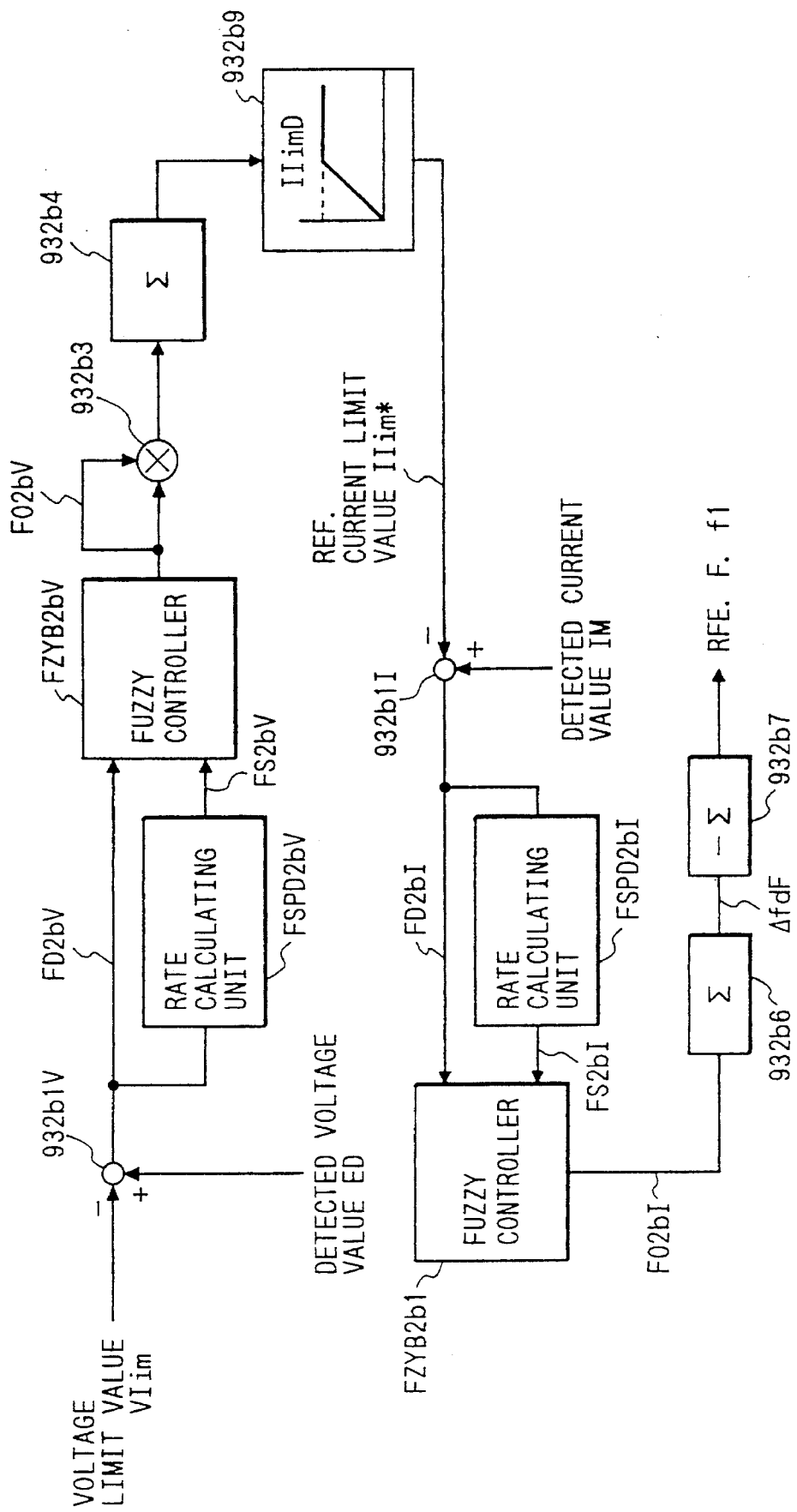
FIG. 21 is a diagram of the fuzzy automatic deceleration unit of one embodiment of the invention.

The fuzzy automatic deceleration unit 932a has an arrangement as shown in FIG. 21. Inputs to the voltage side fuzzy controller FZYB2bV include distance data FD2bV which indicates a difference between the detected voltage value ED and its voltage limiting value $V_{lim}$, and speed data FS2bV which is produced by the speed processing unit FSPD2bV on the basis of the aforementioned difference. An output FO2bV from the fuzzy controller is squared in the multiplier 932b3, then is integrated in the integrator 932b4 so as to generate a reference current limiting value $I_{lim}*$. However, this value $I_{lim}*$ is limited to a value below the decelerating current limiting value $I_{lim}D$ by a limiter 932b9. The distance data FD2bI between this $I_{lim}*$ and a detected current value IM, and also speed data FS2bI produced by a speed processing unit FSPD2bI on the basis of the distance data FD2bI, are input to a current side fuzzy control unit FZYB2bI. An output FO2bI from the current side fuzzy control unit FZYB2bI is added in an integrator 932b6 to provide a fuzzy decelerating rate ΔfdF, which is then added with a negative sign in an integrator 932b7 to generate the reference frequency f1.

Respective values of $I_{lim}*$, ΔfdF and f1 at the time of n samplings are obtained by the following equations 12. [015]

(Equation of Reference Frequency)

$$I_{lim}*(n)=FO2bV(n)+I_{lim}*(n-1)$$

wherein $I_{lim}*$: an output from the integrator 932b4, $$\Delta fdF(n)=FO2bI(n)+\Delta fdF(n-1)$$

where ΔfdF: an output from the integrator 932b6, and $$f1(n)=-\Delta fdF(n)+f1(n-1) \qquad \text{eqs. 12}$$

where f1: an output from the integrator 932b7.

The reason for squaring the voltage side fuzzy output value F2bV is that, because its output value is given in sixteen levels each having a substantially small range, it is desirable to enhance or extend its discernible output range. This squaring method for enhancement can be applied to other fuzzy controllers as well.
(Rules)

The rules to be used within the voltage side fuzzy controller FZYB2$b$ V will be described specifically with reference to FIG. 22. In the drawing, the rule No. 2, for example, indicates "in case the distance is PL and also the speed is PL, then the output should be PL" which means that "when the detected voltage value exceeds its limiting value greatly, and also the voltage is on a substantial increase, the reference current limiting value $I_{lim}$* should be decreased substantially". Although in the voltage side rules for the fuzzy-protected normal deceleration unit shown in FIG. 19, in which, since it is based on the selection method, there is no need for providing means for maintaining the voltage constant, the rules on the side for suppressing the increase of voltage are more enhanced than those on the decreasing side, in FIG. 22, in order to afford variable adjustments and correction by incrementing or decrementing the current reference frequency, an arrangement of substantially a point symmetry is formed around the rule No. 12.

On the other hand, the rules to be utilized within the current fuzzy controller FZYB2$b$I are shown in FIG. 23. They are provided with six differing membership functions with regard to the distance similar to the automatic acceleration control unit described above, thereby defining thirty rules in all. For example, the rule No. 25 expresses "in case the distance is PL and also the speed is PL, then the output should be PL", which means that "when the detected current value exceeds its limiting value greatly, and the current is on the increase to a greater extent, then the decelerating rate should be decreased immediately to a substantial extent". The rules are determined as a whole such that the detected current value IM follows the changing reference current limiting value $I_{lim}$* to coincide therewith.
(Operation)

Figure 24:
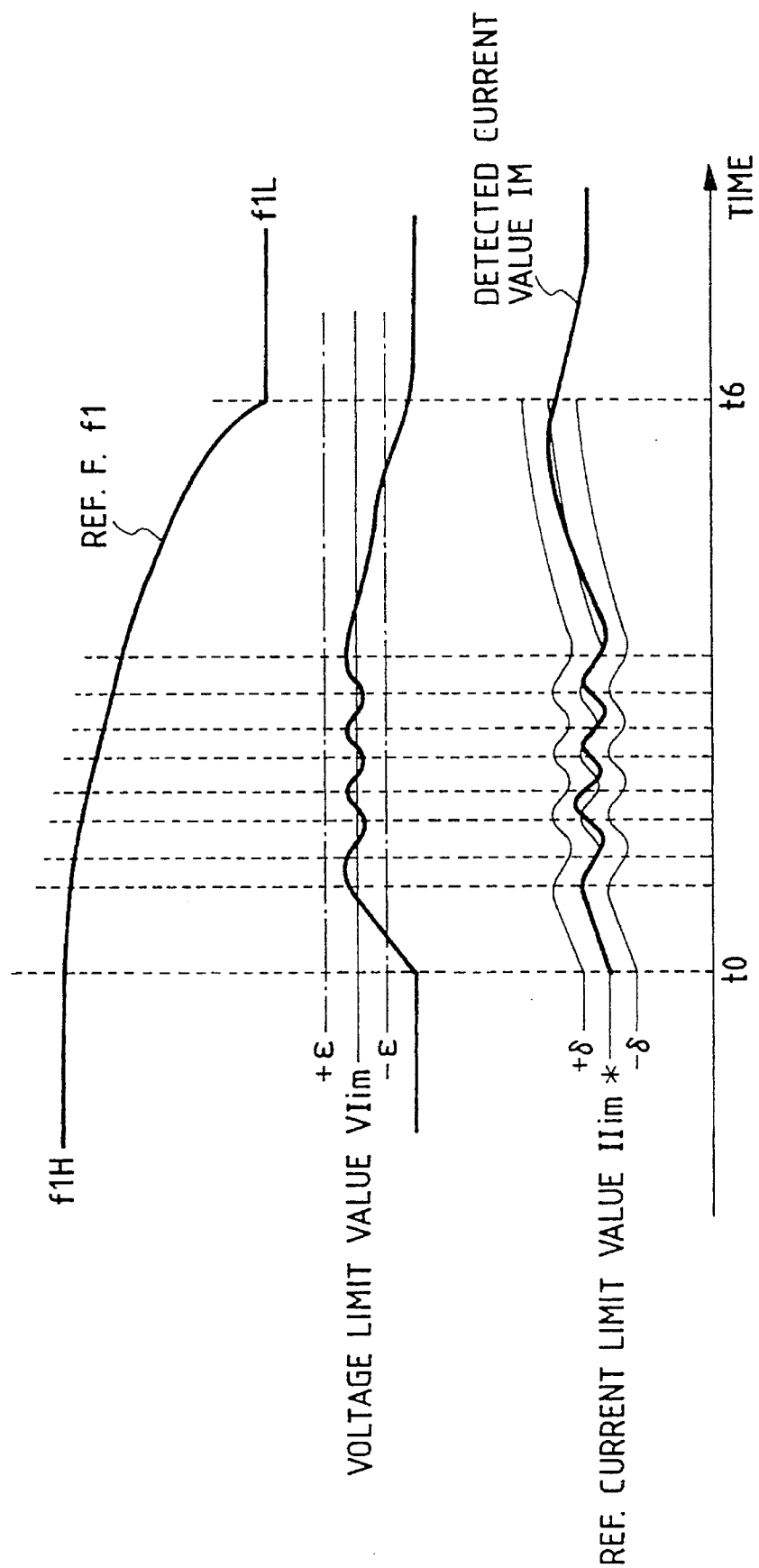
FIG. 24 is a diagram which illustrates the operations of the fuzzy automatic deceleration unit of the invention.

Next, with reference to FIG. 24, changes with time in the detected voltage value ED, reference current limiting value $I_{lim}$* detected current valve IM, and reference frequency f1 will be described. In FIG. 24, a range between ($V_{lim}-\epsilon$) and ($V_{lim}+\epsilon$) around the voltage limiting value $V_{lim}$ in the center therebetween is specified as the range of distance to be covered by the voltage side fuzzy controller, and the range of which is further divided into sixteen levels from 0 to 15 by the distance prescaler FPSS within the fuzzy controller. Further, a range between ($I_{lim}$* $-\delta$) and ($I_{lim}$* $+\delta$) around the reference current limiting value $I_{lim}$* in the center therebetween is specified as the range of distance to be covered by the current side fuzzy controller, and the range of which is further divided into sixteen levels from 0 to 15 by the distance prescaler FPSS within the fuzzy controller. However, a range below ($I_{lim}-\delta$) is included in the level 0, and a range above ($I_{lim}D+\delta$) is included in the level 15. Likewise, a range below ($V_{lim}-\epsilon$) is included in the level and a range above ($V_{lim}+\epsilon$) is included in the level 15. Here, it is also assumed in the following description that the brake 3 shown in FIG. 2 is not operating.

Assume that while operating at a reference frequency f1=f1H, the mode is shifted to the deceleration mode at a time to. On this instance, the reference current limiting value $I_{lim}$* is initialize as a detected current value IM corresponding to this instance. At the beginning of deceleration, since the detected voltage value ED is sufficiently below its limiting value, the reference current limiting value $I_{lim}$* is caused to increase, so that the detected current value will increase in accordance therewith, subsequently detected voltage value will increase in consequence. Then, when the increasing voltage is likely to exceed or has exceeded its limiting value, the reference current limiting value $I_{lim}$* is continuously and variably adjusted to change its course of locus depending on an updated distance and speed data, which is subsequently to be followed by the detected current value. As described above, the reference frequency is adapted to decrease gradually through repetition of alternating increases (regenerating running) and decreases (power running) on the voltage thereby to implement the deceleration according to the invention.

Afterwards, when the mechanical inertial energy becomes small enough along with the decrease in the reference frequency, there occurs no voltage rise any more due to the regenerating running even if a large decelerating rate is applied. Thereby, the decelerating rate can be increased since the reference current limiting value $I_{lim}$* is allowed to keep increasing, with the result that the current increases in accordance therewith. Then, at a time t6, the reference frequency Fq rises to coincide with the set frequency fr=f1L, thereby allowing an exiting from the deceleration mode. Further, although not indicated in FIG. 24, the reference current limiting value $I_{lim}$* is allowed to increase only up to the level of the decelerating current limiting value $I_{lim}D$ at maximum through operation of the limiter 932$b$9.
(Implementation of the Fuzzy-Protected Normal Deceleration)

In the configuration of the fuzzy-protected normal deceleration unit 932$a$ described with regard to FIG. 17, its fuzzy decelerating rate $\Delta fdF$ is described to have been generated using the set decelerating rate $\Delta fd$*; however, the invention is not limited thereto, and the fuzzy automatic deceleration unit 932$a$ as shown in FIG. 21 may be modified to the same purpose. Namely, in addition to the controller configuration of FIG. 17, the execution condition for executing the fuzzy control may be modified to adapt to that which has been described hereinabove with regard to the fuzzy-protected deceleration, and upon comparison of the reference frequency generated by the fuzzy size (fuzzy reference frequency) and the hypothetical reference frequency, an appropriate reference frequency may be selected therefrom, whichever is greater.
{5.5 Fuzzy Automatic Overload Control}
(Controller Arrangement)

Figure 25:
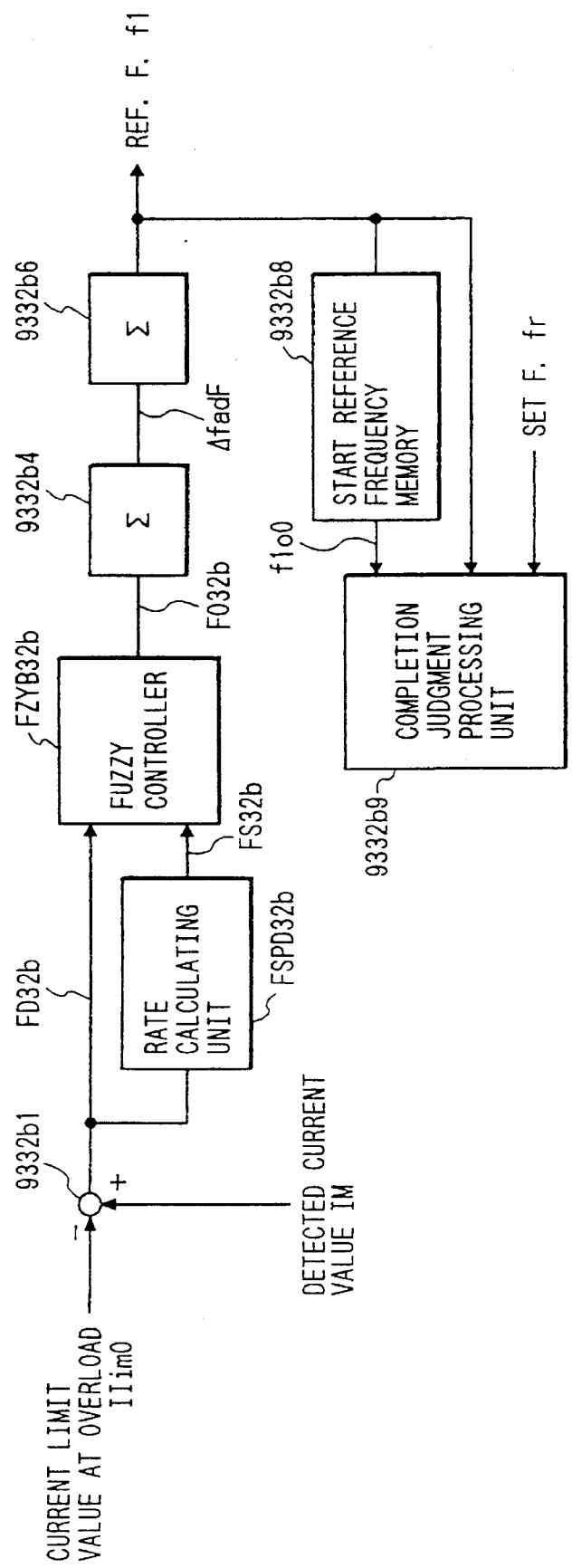
FIG. 25 is a schematic diagram of the fuzzy automatic overload controller of the invention.

The fuzzy automatic overload control unit 9332$b$ has an arrangement as shown in FIG. 25. Inputs to the fuzzy control unit FZYB32$b$, which constitutes a key portion of the controller, include distance data FD32$b$, which is a difference between the detected current value IM and its overload current limiting value $I_{lim}O$, and speed data F032$b$ to be generated by a speed processing unit FSPD32$b$. An output F032$b$ therefrom is added in an integrator 9332$b$4 to produce a fuzzy accelerating and decelerating rate $\Delta fadF$, which is further added in an integrator 9332$b$6 to obtain a reference frequency f1. $\Delta fadF$ and f1 to be obtained at the time of n samplings are expressed by the following equations 13.
(Equation of Reference Frequency)

$$\Delta fadF(n)=F032b(n)+\Delta fadF(n-1)$$

where $\Delta fadF(n)$: an output from the integrator 9332$b$4 (fuzzy accelerating/decelerating rate), and $$f1(n)=\Delta fadF(n)+f1(n-1) \qquad \text{eq. 13}$$

where f1(n): an output from the integrator 931$b$6 (reference frequency).

The execution of this fuzzy automatic overload controller is carried out in the overload judgment unit 935 as has been described above. Then, the reference frequency f1 at the instant of starting the execution is stored as $f1_oO$ in a starting point reference frequency memory means 9332b8. The completion of execution of this fuzzy automatic overload controller is the same as that described with regard to FIGS. 4(a), 4(b) and 4(c). For this judgment of completion of execution there is provided a completion judgment processing unit 9332b 9 to which are input the aforementioned reference frequency $f1_oO$, reference frequency f1, and set frequency fr.

(Rules)

Specific rules to be utilized in the fuzzy controller FZYB32b are shown in FIG. 26. In the drawing, for example, the rule No. 20 expresses "in case the distance is PL and also the speed is PL, then the output should be NL", which means that "in case the detected current value exceeds its limiting value substantially, and the current is on a substantial increase, the accelerating and decelerating rate should be decreased substantially". That is, in this rule No. 20, a value with a negative sign and which is greater in magnitude in absolute value is chosen as its fuzzy output F032b taking into account relevancy to the other rules Nos. 15, 16 and 21 juxtaposed therearound. As a result, the fuzzy acceleration and decelerating rate ΔfadF output from the integrator 9332b4 decreases. Through repetition of such processing, the accelerating and decelerating rate becomes greater in the negative direction, thereby its deceleration becomes faster.

On the other hand, the rule No. 4 expresses that "when the distance is NL and the speed is NL, then the output should be PL", which means that "in case the detected current value is below its limiting value, and the current is on the decrease to a great extent, then the accelerating and decelerating rate should be increased substantially". Namely, in this rule No. 4, a value with the positive sign and greater in magnitude in an absolute value is chosen as its fuzzy output F032b taking into account a relationship with the other rules Nos. 3, 8, and 9 juxtaposed therearound. As a result, the fuzzy accelerating and decelerating rate ΔfadF output from the integrator 9332b4 increases. When this is repeated, the accelerating and decelerating rate increases in the positive direction, hence its acceleration becomes faster.

Namely, the fuzzy automatic overload controller is adapted to control such that the detected current value is maintained in the vicinity of the overloading current limiting value, i.e., by decelerating when the current is on the increase, and by accelerating when the current is on the decrease.

[Advantage of the Invention]

(1) In the frequency control method for controlling the inverter according to the present invention, there are provided fuzzy processing units which, in principle, receive as its inputs two quantities such as a difference between the detected value and its limiting value in current or voltage, and a quantity of change of its difference (in the case the limiting value is constant, it may be a quantity of change in the current or voltage), and outputs a correction or adjustment quantity for correcting an accelerating and decelerating rate generated or the set acceleration and decelerating rate.

This fuzzy processing units determine an increment quantity or decrement quantity for the frequency depending on the distance from its limiting value in current or voltage, and an approaching speed thereto so that the current or voltage may be maintained in the vicinity of its limiting value or below the limiting value. As a result, since an appropriate frequency can be determined taking into account information including differential quantities of the current or voltage, it becomes possible to control the frequency in a predictive manner so that the current or voltage may be maintained in the vicinity of or below the second limiting value which is lower than the first limiting value exceeding of which will cause stoppage of the inverter, thereby realizing the safety operation of the inverter having a more trip-resistant characteristic than the prior art.

(2) According to the present invention, the presetting of the accelerating rates and decelerating rates which have been necessary in the conventional methods will be eliminated, thereby the operator will be freed from the conventional troublesome, time-consuming adjustments of the accelerating and decelerating rates required in advance of the inverter operation. These advantages of the invention will be implemented by the following method such as, at the time of acceleration running, by automatically generating an appropriate accelerating rate on the basis of the output from the fuzzy processing unit, which inputs a difference between the current limiting value and the detected current value, and a quantity of its change (in the case the current limiting value is constant, it may be the detected current value), the current may be maintained in the vicinity of the current limiting value; and further, at the time of deceleration running, by automatically generating an appropriate decelerating rate as a combination of the outputs from the first fuzzy processing unit, which inputs the difference between the current limiting value and the detected current value, and a quantity of its change (in the case the voltage limiting value is constant, it may be the detected voltage value), and from the second fuzzy processing unit, which inputs a difference between the voltage limiting value and a detected voltage value, and a quantity of its change (in the case the voltage limiting value is constant, it may be the detected voltage value), the voltage may be maintained below the voltage limiting value, and also the current may be maintained in the vicinity of the current limiting value. Namely, a complete non-trip operation of the inverter is realized since optimum accelerating and decelerating rates to insure the nontrip operation can be automatically generated in dependency on the mechanical inertia and load.

(3) When the current is likely to rise to the vicinity of its current limiting value while accelerating at a set accelerating rate, the set accelerating and decelerating rate is corrected on the basis of an output from the fuzzy processing unit which receives as its input data a difference between the current limiting value and the detected current value (in the case the current limiting value is constant, it may be the detected current value itself), so that the current may be maintained in the vicinity of and below the current limiting value. On the other hand, when the voltage is anticipated to exceed its voltage limiting value while being decelerated at a set decelerating rate, the set decelerating rate is corrected such that the output and voltage of the fuzzy processing unit, which receives as its input data a difference between the voltage limiting value and the detected voltage value, and a quantity of its change (in the case the voltage limiting value is constant, it may be the detected voltage value itself) may be maintained in the vicinity of or below the voltage limiting value, and also when the current is likely to rise up to the vicinity of the current limiting value, a correction and adjustment is added to the set decelerating rate in dependence on an output from the fuzzy processing unit, which receives as its input data a difference between the current limiting value and the detected current value as well as a quantity of its change (in the case the current limiting value is constant, it may be the detected current value itself), so that even if the set accelerating or decelerating rates have been set erroneously, there occurs no tripping, thus ensuring that the desired acceleration or deceleration will be continued. Further, since the limiter means is provided for accelerating or decelerating frequencies, there occurs no actual rise or fall of the frequency in excess of the allowable rise or fall limit of the frequency for the set accelerating and decelerating rates, so that there occurs no acceleration nor deceleration faster than a suitable set accelerating or decelerating rate corresponding to a suitable acceleration or deceleration period of time. As a result, unnecessarily excessive acceleration or deceleration, which may lead to a damage or destruction of the mechanical system, can be avoided.

(4) When the current increases due to an increase in the load in the steady-state running condition so as to exceed the current limiting value, an update accelerating or decelerating rate at which the subsequent deceleration or acceleration should be executed is generated on the basis of an output from the fuzzy processing unit, which receives as its input a difference between the current limiting value and the current as well as a quantity of its change (in the case the current limiting value is constant, it may be the detected current value itself) so that the current may be maintained in the vicinity of the current limiting value, and thereby an optimum deceleration at an optimum decelerating rate corresponding to the magnitude of an increased load can be carried out. Further, when the load increase is eliminated, an acceleration at a proper accelerating rate in dependence on the magnitude thereof is automatically carried out toward the initial frequency. Thereby, adjustment and setting of decelerating rates at the time of overloading, which have been required in the prior art methods, are no longer necessary.

(5) A dedicated acceleration and deceleration method suitable for a specific application can be implemented by providing normal acceleration and deceleration setting means for setting the aforementioned automatic acceleration and deceleration described in the above item (1) and the accelerating and decelerating rate described in the above item (2), and an acceleration and deceleration method selection means for selecting from the above two acceleration and deceleration means in dependence on a particular set mode input by the operator to the acceleration and deceleration mode setting means. That is, in an application where the acceleration or deceleration time is of no great importance, automatic acceleration or automatic deceleration may be selected, while in an application where the acceleration or deceleration time is desired to be carefully regulated, normal acceleration or deceleration may be selected. In this case, it is advantageous to carry out the automatic acceleration or deceleration operation to obtain its accelerating rate and decelerating rate in advance, then to carry out the normal acceleration or deceleration operation at an acceleration or deceleration rate which has been set smaller than the foregoing acceleration or deceleration rate obtained in the automatic operation, since it will substantially simplify the adjustment of the acceleration or deceleration rate.

On the other hand, an arbitrary operation method arbitrarily selectable according to a specific application can be implemented by providing an arrangement which comprises the overload protection means described in the above item (3), a prior art overload protection means for setting a decelerating rate, and the overload protection mode selection means, and which in combination provides an overload protection method selection means for selecting either one of the above two overload protection means in dependence on the input set mode input by the operator to the overload protection mode selection means.

What is claimed is:

1. In a frequency control method of controlling an inverter which outputs a dc voltage as a variable voltage, variable frequency ac voltage to controllably drive a motor in an accelerating and decelerating mode, the frequency control method comprises the steps of:

conducting a fuzzy inference using at least two physical quantities selected from a group consisting of (1) a difference between a motor current and a current limit value, (2) a quantity of change of the difference between the motor current and the current limit value, and (3) a quantity of change of the motor current;

obtaining an accelerating/decelerating rate of a frequency to be output from said inverter on a basis of the fuzzy inference, such that a motor current flowing through said motor at the time of acceleration and deceleration is maintained within a preset range which includes the current limit value; and controlling an output frequency from the inverter in dependence on said accelerating/decelerating rate.

2. In a frequency control method of controlling an inverter which outputs a variable voltage, variable frequency ac voltage to controllably drive a motor to be driven at a preset accelerating rate and decelerating rate, the frequency control method comprising the steps of:

when a motor current flowing through said motor exceeds a current limit value, conducting a fuzzy inference using at least two physical quantities selected from a group consisting of (1) a difference between the motor current and the current limit value, (2) a quantity of change of the difference between the motor current and the current limit value, and (3) a quantity of change of the motor current;

obtaining an accelerating/decelerating rate of frequency to be output from said inverter on a basis of the fuzzy inference, such that the motor current flowing through said motor at the time of acceleration and deceleration is maintained within a preset range inclusive of the current limit value; and controlling an output frequency from the inverter in dependence on said accelerating/decelerating rate.

3. A frequency control method of controlling an inverter according to claim 1 or 2, further comprising the steps of:

conducting a further fuzzy inference using at least two quantities selected from a group consisting of (1) a difference between a voltage value of said inverter and a reference value, (2) a quantity of change of the difference between the voltage value of said inverter and the reference value, and (3) a quantity of change of the voltage value;

obtaining a decelerating rate for a frequency to be output from said inverter on a basis of the further fuzzy inference, such that the voltage of said inverter is included in a preset range which is also inclusive of the reference value;

selecting a control rate from a group consisting of the thus obtained decelerating rate and the accelerating/decelerating rate, whichever is smaller; and controlling the output frequency from the inverter in dependence on the thus selected control rate.

4. A frequency control method of controlling an inverter which outputs a variable voltage, variable frequency ac voltage to control a motor to be driven in an accelerating mode and decelerating mode, the frequency control method comprising the steps of:

conducting a fuzzy inference using at least two physical quantities selected from a group consisting of (1) a difference between a voltage value of said inverter and a reference value, (2) a quantity of change of the difference between the voltage value of said inverter and the reference value, and (3) a quantity of change of the voltage value:

obtaining a current limit value for a current flowing through said motor on a basis of the fuzzy inference, such that the voltage of said inverter is included in a preset range which is also inclusive of the reference value;

conducting a second fuzzy inference using at least two quantities selected from a group consisting of (1) a difference between the motor current and the current limit value, (2) a quantity of change of the difference between the motor current and the current limit value, and (3) a quantity of change of the motor current;

obtaining a decelerating rate for a frequency to be output from said inverter on a basis of the second fuzzy inference, such that a motor current flowing through said motor at a time of deceleration is included in a preset range which is also inclusive of the current limit value; and controlling an output frequency from the inverter in dependence on said current limit value or decelerating rate.

5. In a drive apparatus for driving a motor having an inverter which outputs a variable voltage, variable frequency ac voltage to drive the motor, and a control circuit which determines an output frequency output from the inverter, a frequency control apparatus for controlling the inverter comprising:

a first fuzzy control means for generating a reference current limit value by inputting two quantities selected from a group consisting of (1) a difference between an input dc voltage to the inverter and a reference voltage limit value, (2) a quantity of change of the difference between the input dc voltage to the inverter anti the reference voltage limit value, and (3) a quantity of change of the input dc voltage; and a second fuzzy control means for outputting a quantity relating to a decelerating rate for the output frequency by inputting two quantities selected from a group consisting of (1) a difference between a motor current and said reference current limit value, and (2) a quantity of change of the difference between the motor current and said reference current limit value; and wherein the first fuzzy control means generates said reference current limit value such that an inverter input dc voltage is maintained in a vicinity of the reference voltage limit value, while the second fuzzy control means determines a quantity relating to a decelerating rate for the output frequency thereby to decelerate the motor such that a motor current is maintained in a vicinity of said reference current limit value.

6. In a drive apparatus for driving a motor having an inverter which outputs a variable voltage, variable frequency ac voltage to drive the motor, and a control circuit which determines an output frequency output from the inverter, an inverter frequency control apparatus comprising:

a first fuzzy control means which inputs two input data selected from a group consisting of (1) data representing a difference between an input dc voltage to the inverter and a reference voltage limit value, (2) data representing a quantity of change of the difference between the input dc voltage to the inverter and the reference voltage limit value, and (3) data representing a quantity of change of the input dc voltage; and then outputs a first quantity relating to a decelerating rate for the output frequency;

a second fuzzy control means which inputs two input data selected from a group consisting of (1) data representing a difference between a motor current and said reference current limit value, (2) data representing a quantity of change of the difference between the motor current and said reference current limit value, and (3) data representing a quantity of changed of the motor current, and then outputs a second quantity relating to a decelerating rate for the output frequency; and a selection means for selecting either one of said first quantity and said second quantity relating to the decelerating rate for the output frequency through comparison on a basis of a greater or smaller relationship therebetween; and wherein the first fuzzy control means determines the first quantity relating to the decelerating rate for the output frequency such that the input dc voltage is maintained in a vicinity of and below the reference voltage limit value; the second fuzzy control means determines the second quantity relating to the decelerating rate for the output frequency such that the motor current is maintained in the vicinity of the reference current limit value; the selection means is adapted to select a third quantity relating to the decelerating rate on either side of the first and the second quantities, whichever will decrease the decelerating rate; so that by determining an appropriate decelerating rate on a basis of a selected quantity relating to the decelerating rate it is possible to decrease the output frequency so as to decelerate the motor.

7. In a drive apparatus for driving an induction motor having an inverter which outputs a variable voltage, variable frequency ac voltage for driving the induction motor, a control circuit for determining an output frequency from the inverter, and a parameter setting means for setting an accelerating rate for the output frequency, an inverter frequency control apparatus comprising:

a fuzzy control means which inputs two quantities selected from a group consisting of (1) a difference between a motor current and a current limit value, (2) a quantity of change of the difference between the motor current and the current limit value, and (3) a quantity of change of the motor current, and then outputs a quantity relating to an accelerating rate for the output frequency; and an integrator which adds up a set accelerating rate input from said parameter setting means to generate a first reference frequency, wherein, while accelerating the motor with an output frequency determined on a basis of said first reference frequency, when the motor current exceeds the current limit value or is predicted to be in the vicinity thereof, said fuzzy control means operates to determine a fuzzy side accelerating rate from said quantity relating to said accelerating rate for the output frequency, to generate a second reference frequency by adding up said fuzzy side accelerating rate, and wherein said second reference frequency and said first reference frequency are compared to select a smaller reference frequency therefrom as a corrected output frequency, thereby to accelerate the motor.

8. In a drive apparatus for driving an induction motor having an inverter which outputs a variable voltage, variable frequency ac voltage for driving the induction motor, a control circuit for determining an output frequency from the inverter, and a parameter setting means for setting a decelerating rate for the output frequency, an inverter frequency control apparatus comprising:

a first fuzzy control means which inputs two quantities selected from a group consisting of (1) data representing a difference between an input dc voltage to the inverter and a reference voltage limit value, (2) data representing a quantity of change of the difference between the input dc voltage to the inverter and the reference voltage limit value, and (3) data representing a quantity of change of the input dc voltage; and then outputs a reference current limit value, the upper limit of which is preset at a maximum current limit value;

a second fuzzy control means which inputs two quantities selected from a group consisting of (1) data representing a difference between a motor current and said reference current limit value, and (2) data representing a quantity of change of the difference between the motor current and said reference current limit value, and then outputs a quantity relating to a decelerating rate for the output frequency; and an integrator which adds up a set accelerating rate input from said parameter setting means to generate a first reference frequency, and wherein, while decelerating the motor at the output frequency determined on a basis of said first reference frequency, when the motor current rises to a vicinity or above said maximum current limit value or is predicted to be in the vicinity thereof, or when an inverter input dc voltage rises to the vicinity or above said voltage limiting value or is predicted to be in the vicinity thereof, said first fuzzy control means operates to generate said reference current limit value such that the inverter input dc voltage is maintained in the vicinity of the voltage limiting value, said second fuzzy control means operate to determine a second reference frequency from the quantity relating to the decelerating rate for the output frequency, such that the motor current is maintained in the vicinity of said reference current limit value, wherein said second reference frequency and said first reference frequency are compared to select a greater reference frequency therefrom as a corrected output frequency, thereby to decelerate the motor.

9. In a drive apparatus for driving an induction motor having an inverter which outputs a variable voltage, variable frequency ac voltage for driving the induction motor, a control circuit for determining an output frequency from the inverter, and a parameter setting means for setting a decelerating rate for the output frequency, an inverter frequency control apparatus comprising:

a first fuzzy control means which inputs two quantities selected from a group consisting of (1) data representing a difference between an input dc voltage to the inverter and a reference voltage limit value, (2) data representing a quantity of change of the difference between the input dc voltage to the inverter and the reference voltage limit value, and (3) data representing a quantity of change of the input dc voltage; and then outputs a first quantity relating to the decelerating rate for the output frequency;

a second fuzzy control means which inputs two quantities selected from a group consisting of (1) a difference between a motor current and said reference current limit value, (2) a quantity of change of the difference between the motor current and said reference current limit value, and data representing a quantity of change of the motor current, and then outputs a second quantity relating to the decelerating rate for the output frequency;

a selection means for selecting either one of said first and second quantities relating to the decelerating rate for the output frequency through comparison on a greater or smaller relationship therebetween; and an integrator which adds up a set decelerating rate input from said parameter setting means to generate a first reference frequency, and wherein, while decelerating the motor at an output frequency which is determined on a basis of said first reference frequency, when a motor current rises to a vicinity of or above said reference current limit value or is predicted to be in the vicinity thereof, or when the input dc voltage rises to a vicinity of or above said reference voltage limit value or is predicted to be in the vicinity thereof, the first fuzzy control means operates to determine the first quantity relating to the decelerating rate for the output frequency, such that the input dc voltage is maintained in the vicinity of and below the reference voltage limit value, and the second fuzzy control means operates to determine the second quantity relating to the decelerating rate for the output frequency, such that the motor current is maintained in the vicinity of the reference current limit value;

wherein said selection means operates to select one of the quantities relating to the decelerating rate that will result in a reduced decelerating rate, thereby a fuzzy side accelerating rate is determined on a basis of the thus selected one of the quantities relating to the decelerating rate; the integrator generates a second reference frequency by adding up the fuzzy side decelerating rate; and whereby, through comparison of the second reference frequency and the first reference frequency, a greater reference frequency is selected therefrom as a corrected output frequency, thereby to decelerate the motor.

10. In a motor drive apparatus for driving a motor having an inverter which outputs a variable voltage, variable frequency ac voltage to drive the motor, and a control circuit which determines an output frequency for the inverter, an inverter frequency control method of controlling the motor drive apparatus, comprising the steps of:

outputting a quantity relating to an accelerating or decelerating rate for the output frequency using a fuzzy control means which inputs as its input data two quantities selected from a group consisting of (1) a difference between a motor current and a current limit value, (2) a quantity of change of the difference between the motor current and the current limit value, and (3) a quantity of change of the motor current;

inputting a set frequency corresponding to the output frequency for the inverter;

while in a constant speed condition in which the set frequency coincides with the output frequency, when a motor current rises to a vicinity of or above said current limit value or is predicted to be in the vicinity thereof, selecting said quantity relating to the accelerating or decelerating rate for the output frequency such that the motor current is maintained in the vicinity of said current limit value; and generating a corrected output frequency in dependence on the selected quantity, thereby to drive the motor in an accelerating or decelerating mode of operation.

11. The inverter frequency control method according to claim 10 wherein, while accelerating the motor according to the output frequency produced in dependence on the quantity relating to the accelerating or decelerating rate for said output frequency, when said set frequency becomes greater than the output frequency at a time of said constant speed operation, or when the output frequency at a time of the accelerating operation becomes equal to the output frequency at a time of said constant speed operation, generation of a corrected output frequency in dependence on the quality relating to the accelerating or decelerating rate for said output frequency is interrupted.

12. In a drive apparatus for driving an induction motor having an inverter which outputs a variable voltage, variable frequency ac voltage to drive the motor, a control circuit which determines an output frequency for the inverter, and a parameter setting means which sets an accelerating rate for the output frequency, an inverter frequency control apparatus comprising:

a first acceleration control means comprising a first fuzzy control means which inputs a quantity selected from a group consisting of (1) a difference between a motor current and a current limit value, (2) a quantity of change of the difference between the motor current and the current limit value, and (3) a quantity of change of the motor current, and then outputs a first quantity relating to an accelerating rate for the output frequency, and a first integrator which produces a first reference frequency in dependence on the first quantity relating to the accelerating rate for said output frequency;

a second acceleration control means comprising a second fuzzy control means which inputs a quantity selected from a group consisting of (1) a difference between a motor current and a current limit value, (2) a quantity of change of the difference between the motor current and the current limit value, and (3) a quantity of change of the motor current, and then outputs a second quantity relating to the accelerating rate for the output frequency, a second integrator which produces a second reference frequency on a basis of said second quantity relating to the accelerating rate for said output frequency, a third integrator which produces a third reference frequency by adding up the set accelerating rate input from said parameter setting means, and a selecting means which selects a smaller frequency as a corrected output frequency from said second reference frequency and said third reference frequency; and an acceleration controller selection means which selects either one of said first acceleration control means and said second acceleration control means, whereby the selected acceleration control means determines a corrected output frequency, thereby to accelerate the motor.

13. In a drive apparatus for driving an induction motor having an inverter which outputs a variable voltage, variable frequency ac voltage to drive the motor, a control circuit which determines an output frequency for the inverter, and a parameter setting means which sets a decelerating rate for the output frequency, an inverter frequency control apparatus comprising:

a first deceleration control means comprising a first fuzzy control means which inputs a quantity selected from a group consisting of (1) a difference between an input dc voltage to the inverter and a reference voltage limit value, (2) a quantity of change of the difference between the input dc voltage to the inverter and the reference voltage limit value, and (3) a quantity of change of the input dc voltage; a second fuzzy control means which inputs a quantity selected from a group consisting of (1) a difference between a motor current and a reference current limit value, and (2) a quantity of change of the difference between the motor current and said reference current limit value; and then outputs a first quantity relating to a decelerating rate for the output frequency, and a first integrator which adds up the first quantity relating to the decelerating rate of said output frequency to generate a first reference frequency;

a second deceleration control means comprising a third fuzzy control means which inputs a quantity selected from a group consisting of (1) said difference between said input dc voltage to the inverter and said reference voltage limit value, (2) said quantity of change of the difference between the input dc voltage to the inverter and the reference voltage limit value, and (3) said quantity of change of the input dc voltage; and then outputs a second current limiting value, a fourth fuzzy control means which inputs a quantity selected from a group consisting of (1) said difference between said motor current and a reference current limit value, and (2) said quantity of change of the difference between the motor current and said reference current limit value and then outputs a second quantity relating to the decelerating rate for the output frequency, a second integrator which adds up the second quantity relating to the decelerating rate for said output frequency to produce a second reference frequency, a third integrator which adds up the set decelerating rate input from said parameter setting means to produce a third reference frequency, and a selector which selects a smaller frequency from the two of said second reference frequency and said third reference frequency as an output frequency; and a deceleration control means selection means which selects either one of said first deceleration control means and said second deceleration control means, whereby the selected deceleration control means determines a corrected output frequency, thereby to decelerate the motor.

14. An inverter frequency control device for a motor drive apparatus for driving a motor having an inverter which outputs a variable voltage, variable frequency ac voltage to drive the motor, a brake means which prevents an input dc voltage to said inverter from becoming an overvoltage at the time of decelerating the motor, and a control circuit which determines an output frequency for said inverter, the inverter frequency control device comprising:

a protection circuit which stops an operation of the inverter when an inverter input dc voltage exceeds a first voltage limit value;

a brake control means which actuates said brake means when the inverter input dc voltage exceeds a second voltage limit value; and a fuzzy control means which inputs as its input data two quantities, including a quantity selected from a group consisting of (1) a difference between the inverter input dc voltage and a third voltage limit value, (2) a quantity of change of the difference between the inverter input dc voltage and the third voltage limit value, and (3) a quantity of change of the inverter input dc voltage, whereby the output frequency of said inverter is controlled in dependence on an output from said fuzzy control means, thereby to decelerate the motor; and wherein said third voltage limit value is set at a smaller value than said first voltage limit value, but is set at a greater value than said second voltage limit value.

\* \* \* \* \*